(12) United States Patent
Harris et al.

(10) Patent No.: US 7,978,747 B1
(45) Date of Patent: Jul. 12, 2011

(54) WAVEFORM DESIGN HOPPING SYSTEM AND METHOD

(75) Inventors: Johnny M. Harris, Centerville, UT (US); Thomas R. Giallorenzi, Riverton, UT (US); Randal R. Sylvester, West Valley, UT (US); Richard Galindez, Draper, UT (US); Kevin L. Hyer, North Salt Lake, UT (US); Larry S. Thomson, Bountiful, UT (US); Samuel C. Kingston, Salt Lake City, UT (US)

(73) Assignee: L-3 Communications Corp., New York, NY (US)

( * ) Notice: Subject to any disclaimer, the term of this patent is extended or adjusted under 35 U.S.C. 154(b) by 1271 days.

(21) Appl. No.: 11/351,370

(22) Filed: Feb. 9, 2006

(51) Int. Cl.
*H04B 1/00* (2006.01)

(52) U.S. Cl. ........ 375/130; 375/132; 375/134; 375/135; 375/137; 375/140; 714/776; 714/786; 714/790; 714/794; 370/342; 370/343; 370/345; 370/335; 370/328

(58) Field of Classification Search ............ 375/130, 375/132, 134, 135, 137, 140; 714/776, 786, 714/790, 794; 370/342, 343, 345, 335, 328
See application file for complete search history.

(56) References Cited

U.S. PATENT DOCUMENTS

| | | | |
|---|---|---|---|
| 5,598,154 A * | 1/1997 | Wilson et al. ................ | 341/50 |
| 5,724,383 A | 3/1998 | Gold et al. | |
| 5,751,761 A | 5/1998 | Gilhousen ................... | 375/200 |
| 6,005,883 A * | 12/1999 | Trompower ................. | 375/141 |
| 6,091,760 A | 7/2000 | Giallorenzi et al. .......... | 375/140 |
| 6,285,681 B1 | 9/2001 | Kolze et al. | |
| 6,657,985 B1 | 12/2003 | Park ........................... | 370/342 |
| 6,807,154 B1 | 10/2004 | Malmgren et al. | |
| 6,829,317 B2 | 12/2004 | Mege et al. | |
| 6,879,561 B1 | 4/2005 | Zhang et al. | |
| 6,999,432 B2 | 2/2006 | Zhang et al. | |
| 7,027,484 B1 | 4/2006 | Tiedemann, Jr. | |
| 7,200,154 B1 | 4/2007 | Wu et al. | |
| 2002/0097703 A1 * | 7/2002 | Nieczyporowicz et al. .. | 370/342 |
| 2003/0099280 A1 * | 5/2003 | Kumar et al. ................ | 375/130 |
| 2004/0125788 A1 | 7/2004 | Pietraski et al. | |
| 2004/0228267 A1 * | 11/2004 | Agrawal et al. ............. | 370/203 |

OTHER PUBLICATIONS

"Multiplex Systems Using Sums of Walsh Functions", Hubner, H., 1971 Proceedings, Second Edition, pp. 180-181.

(Continued)

*Primary Examiner* — Dac Ha
*Assistant Examiner* — Zewdu Kassa
(74) *Attorney, Agent, or Firm* — Kirton & McConkie; William T. Ralston

(57) ABSTRACT

A method of transmitting a spread spectrum signal in a single communication session between a transmitter and a receiver, stores a series of N unique waveform designs and a hopping sequence in a transmitter memory. A signal is transmitted to a receiver according to the hopping sequence using the plurality of N unique waveform designs. Preferably, each waveform design is characterized by a unique composite spreading code that is formed by at least some of a plurality of constituent code segments. Alternatively or additionally, the waveform designs may differ by any one or more of code length, symbol or chip timing or phase, frame or burst structure, chip offset, modulation, error control coding, encryption scheme, or scrambling code. A transmitter and receiver are also disclosed, as is the concept of appending chips between symbols to expand the universe of unique spreading codes without incurring an increase in processing gain.

14 Claims, 18 Drawing Sheets

OTHER PUBLICATIONS

"The Multiplexing of Telephone Signals by Walsh Functions", Davidson, I.A., Applications of Walsh Functions, 1971 Proceedings, Second Edition, Eds. R.W. Zeek and A.E. Showalter, pp. 177-179.

"A Two-Layer Spreading Code Scheme for Dual-Rate DS-CDMA Systems", Yao, Yingwei, et al., IEEE Transactions on Communications, vol. 51, No. 6, Jun. 2003, pp. 873-879.

Srivastava et al., "Using Game Theory to Analyze Wireless Ad Hoc Networks", Virginia Polytechnic Institute and State University, Blacksburg, Virginia, IEEE Commun. Surveys Tuts., vol. 7, No. 4, pp. 46-56, 2005.

P. Venkitasubramaniam, Ting He and Lang Tong. "Relay Secrecy in Wireless Networks with Eavesdroppers". 44th Allerton Conference on Communication, Control and Computing, Sep. 2006.

Neel, "How Does Game Theory Apply to Radio Resource Management?", PhD dissertation, Virginia Tech, Jan. 2004.

U.S. Appl. No. 12/394,429, filed Feb. 27, 2009, Giallorenzi et al.

U.S. Appl. No. 12/383,059, filed Mar. 18, 2009, Harris et al.

* cited by examiner

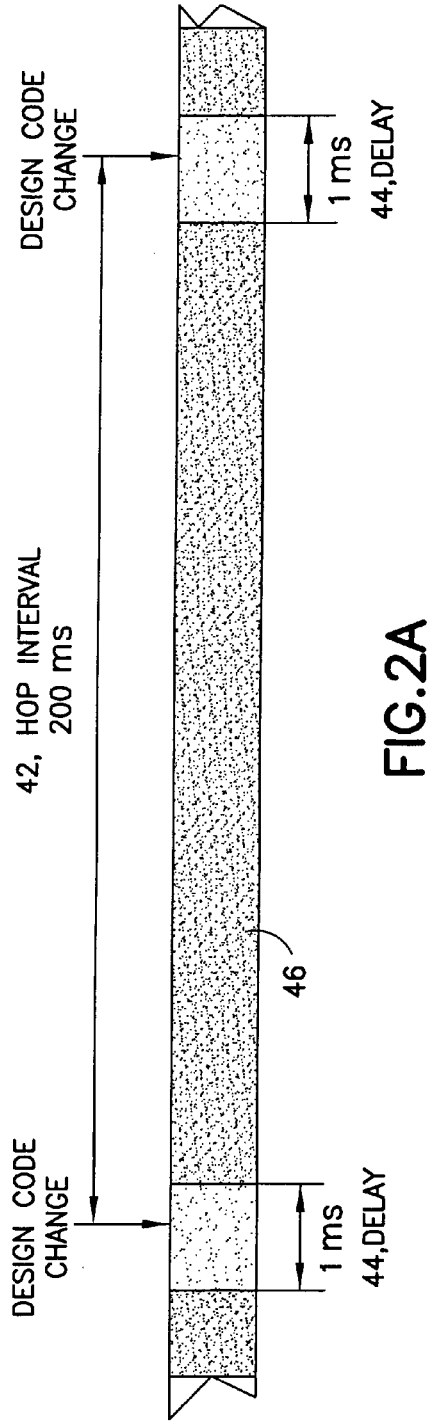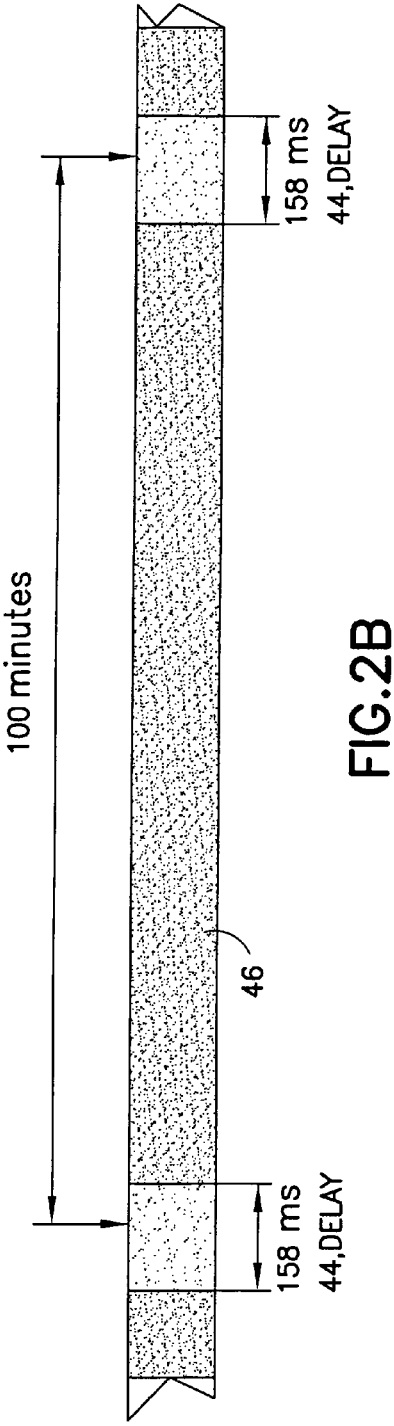

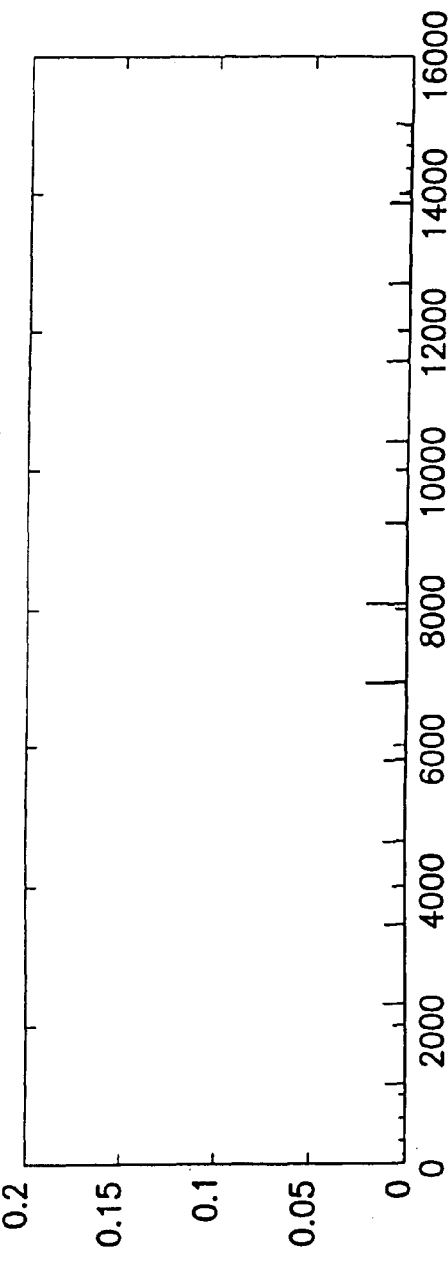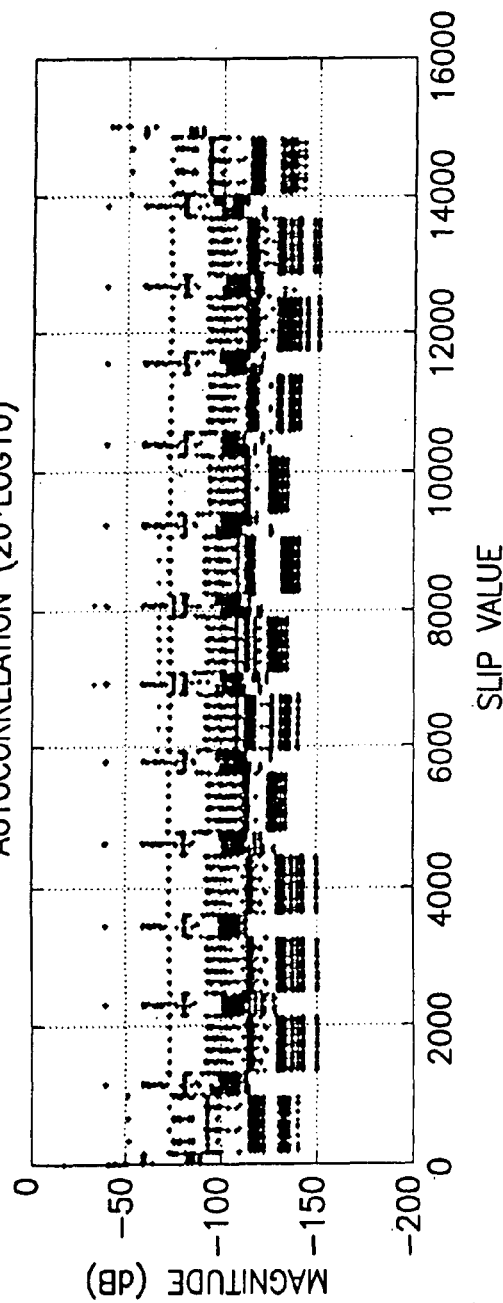
FIG.7A

WAVEFORM DESIGN HOPPING SYSTEM AND METHOD

CROSS REFERENCE TO RELATED APPLICATIONS

This application is related to the following pending U.S. patent application Ser. No. 10/610,968 by Eric T. Hall et al. and entitled "Pseudo Noise Code Hopping Method and Apparatus" filed on Jun. 30, 2003; Ser. No. 10/915,776 by Johnny M. Harris et al. and entitled "Doped Multi-Rate Spread Spectrum Composite Code" filed on Aug. 10, 2004; Ser. No. 10/915,777 by Samuel C. Kingston et al. and entitled "Multi-Rate Spread Spectrum Composite Code" filed on Aug. 10, 2004; Ser. No. 11/136,783 by Thomas R. Giallorenzi et al. and entitled "Method and Apparatus to Initiate Communications Between an Unknown Node and an Existing Secure Network" filed on May 24, 2005; Ser. No. 11/136,943 by Johnny M. Harris et al. and entitled "Method and Apparatus for Efficient Carrier Bin Search for a Composite Spreading Code" filed on May 24, 2005; Ser. No. 11/136,782 by Johnny M. Harris et al. and entitled "Sub-Sequence Accumulation Filter and Method" filed on May 24, 2005; and Ser. No. 11/136,789 by Thomas R. Giallorenzi et al. and entitled "Fast and Long Range Node Discovery in Spread Spectrum Networks" filed on May 24, 2005. Each of the above applications is incorporated by reference.

FIELD OF THE INVENTION

The present invention relates to spread spectrum communication systems, particularly, hopping of waveform designs among channels of a spread spectrum communication system.

BACKGROUND

In digital spread spectrum (DSS) communication, a wide band carrier signal is modulated by a narrow band message signal. The wide-band carrier is typically generated by modulating a single frequency carrier using a pseudo-random noise (P/N) code sequence. The data rate at which a message is communicated is usually much lower than the P/N code symbol or "chip" rate. The ability of DSS to suppress interference is proportional to a ratio of the chip rate to data rate. In many applications, there are thousands of code chips per data bit. There are two basic types of DSS systems: direct sequence spread spectrum systems (DSSS) and frequency hop spread spectrum systems (FHSS).

The DSSS systems spread the signal over a bandwidth $f_{RF} \pm R_c$, where $f_{RF}$ represents the center bandpass carrier frequency and $R_c$ represents the PN-code maximum chip rate, which in turn is an integer multiple of the symbol rate R. Multiple access systems employ DSSS techniques when transmitting multiple channels over the same frequency bandwidth to multiple receivers, each receiver having its own designated PN-code. Although each receiver receives the entire frequency bandwidth only the signal with the receiver's matching PN-code will appear intelligible, the rest appears as noise that is easily filtered. The DHSS system PN-code sequence spreads the data signal over the available bandwidth such that the carrier appears to be noise-like and random, but is deterministic to a receiver using the same PN-code. These systems are well known in the art and will not be discussed further.

FHSS systems employ a PN-code sequence generated at the modulator that is used in conjunction with an m-ary frequency shift keying (FSK) modulation to shift the carrier frequency $f_{RF}$ at a hopping rate $R_h$. A FHSS system divides the available bandwidth into N channels and hops between these channels according to the PN-code sequence. At each frequency hop time a PN generator feeds a frequency synthesizer a sequence of n chips that dictates one of 2n frequency positions. The receiver follows the same frequency hop pattern. FHSS systems are also well known in the art and need not be discussed further.

At the receiver, a carrier replica is generated by reducing the DSS signal to baseband and multiplying it with a locally generated replica of the original narrow-band carrier using a local oscillator. If the frequency and phase of the carrier replica is the same as that of the received original narrow-band carrier, then the multiplier output signal will be the product of the bipolar P/N code and intended message. The P/N code is removed by multiplying the wide-band data stream with the locally generated replica of the P/N code that is time aligned with the received P/N code. The de-spreading process of generating the carrier replica with proper carrier frequency and phase and generating the P/N code replica at the proper rate and time offset is a complex problem. In many DSS communication systems, the necessary carrier frequency, carrier phase, and P/N code offset are not known a priori at the receiver, which tries different values until a large signal is observed at the data-filter output. This is termed the search or acquisition process, and a DSS signal is said to be acquired when the proper frequency, phase, and code offset have been determined.

The above cross-referenced patent applications also detail various concerns for security in DSS communication systems, along with exemplary wireless environments in which a secure DSS system is advantageously deployed. One such security concern is low probability of intercept (LPI) and low probability of detection (LPD) by adverse parties of messages sent over the secure DSS system. Once a secure spreading code is known to an unauthorized user, some or all of the messages over the system may be compromised, and the breach may not be known immediately to the authorized parties. Further, in some communication systems such as space-based satellite DSS systems that may or may not be a secure system, certain hardware systems must be hardened against ambient radiation such as alpha particles. Typically, the hardware of concern is made to resist some minimal level of radiation and the overall system employs triple redundancy to ensure against failure of any single or pair of like components. This is an expensive proposition, both in the radiation hardening, in the redundancy of components, and in the additional weight to be launched into space. By reloading often, some of this redundancy may be eliminated.

Frequency hopping is known in the art. Adaptive modulation is also known in the art of multiple-input/multiple output communication systems, but this is generally not considered a hopping technique as modulation is changed in response to channel conditions rather than according to a predetermined schedule or sequence. It is also known in the art to use code hopping as an encryption technique for securing communications in a DSS system. For example, U.S. Pat. No. 6,657,985 to Su-Won Park, entitled "Orthogonal Code Hopping Multiple Access Communication System", describes a system that divides channels according to hopping patterns of the orthogonal codes allotted to the respective channels. In an illustrated embodiment, a first orthogonal code OC hops three times for every bit stream duration, a second OC hops once per bit stream duration, and a third OC hops at multiples of the bit stream duration (n=2 in FIG. 4). The hopping code on each channel then repeats over the fraction or multiple of the bit stream duration. While advantageous in reducing probability of detection, this is seen to expose the secure communication system to compromise if an adverse party should gain access to a transmitter or receiver. This results in an increase to probability of interception, because each transmitter and receiver has a hopping controller or a memory that has the hopping pattern stored within. Interrupting the hopping repetition is not seen to resolve this security risk, as all hopping patterns and codes are seen to be stored and subject to breach if the hardware is compromised.

What is needed in the art is a cost-effective way to enhance security in a DSS communication system without inordinately spending bandwidth.

SUMMARY OF THE INVENTION

In accordance with one aspect, the present invention is a method of transmitting a spread spectrum signal in a single communication session between a transmitter and a receiver. A single communication session may be a single set of sequential bursts from the transmitter, or may be a two-way exchange of information back and forth. Generally, a single communication session entails a single allocation of communication resources such as traffic channels, though the method may be executed only on side channels. In the method a series of N unique waveform designs are stored in a memory of a transmitter, as well as a hopping sequence of those N waveform designs. A signal is transmitted to a receiver using a plurality of those N unique waveform designs according to the hopping sequence. N is an integer greater than two, preferably much greater. Preferably, each waveform design is characterized by a unique composite spreading code that is formed by at least some of a plurality of constituent code segments. The unique combination may be a common set of constituent code segments combined by different combinatorial logic, different code segments combined by a common set of combinatorial logic, differing numbers of chips inserted between symbols, or any number of unique combinations to achieve a unique composite spreading code. Alternatively or additionally, the waveform designs may differ by any one or more of code length, symbol or chip timing or phase, frame or burst structure, chip offset, modulation, error control coding, encryption scheme, or scrambling code.

The present invention is in another aspect a transmitter that has a memory, a source of user data, a field programmable gated array FPGA, and a transmit antenna. The memory is for storing software instructions that describe a plurality of unique waveform designs, and a hop sequence ordering the plurality of unique waveform designs. The FPGA is coupled to the memory and has an input coupled to an output for the source of user data. The FPGA is for loading a signal from the source of user data according to different waveforms as ordered by the hop sequence. Depending on the software, the FPGA may load the waveform through a modulator, a spreader, a scrambling code block, a rate encoder, or any various other processing blocks known in the art that define a waveform. Preferably, the memory further stores a plurality of constituent code segments where each waveform design defines a unique combination of at least some of the constituent code segments, such as different code segments, different combinatorial logic, different numbers of chips inserted between symbols, and the like. Preferably, the FPGA also re-loads the software on each change of the waveform design, each change in the hop sequence.

In yet another aspect, the present invention is a receiver that has a receive antenna, a demodulator, a correlator, a memory, and a controller. The receive antenna is for receiving a spread spectrum signal. The demodulator is for demodulating the received spread spectrum signal. The correlator is for correlating, during each of n hop intervals, a portion of the signal received within the $n^{th}$ hop interval with a $n^{th}$ unique composite spreading code. The memory is coupled to the correlator through a controller, and is for storing a plurality of constituent codes and at least n unique instructions for forming the n unique composite spreading codes from the stored plurality of constituent spreading codes.

These and other features, aspects, and advantages of embodiments of the present invention will become apparent with reference to the following description in conjunction with the accompanying drawings. It is to be understood, however, that the drawings are designed solely for the purposes of illustration and not as a definition of the limits of the invention.

BRIEF DESCRIPTION OF THE DRAWINGS

FIG. 2A is a timing diagram showing a hopping sequence that may be implemented on a synchronous side channel according to an embodiment of the present invention.

FIG. 2B is similar to FIG. 2A, but for an asynchronous side channel.

FIGS. 7A-7B are similar to FIGS. 6A-6B, but for an averaging time of 8 symbols.

DETAILED DESCRIPTION

Figure 1:
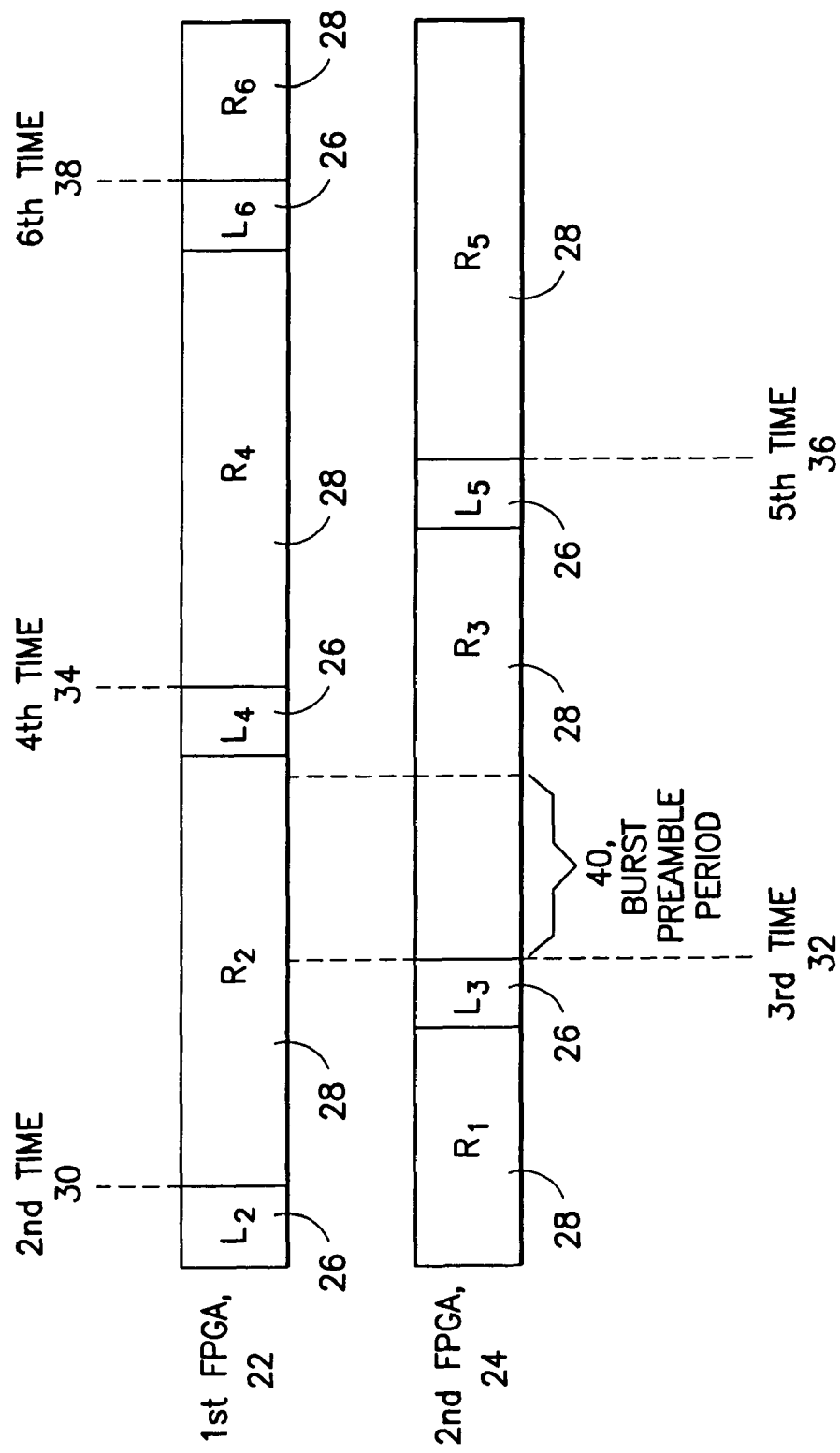
FIG. 1 is a timing diagram showing a relative hopping sequence among two burst receivers at a single network node according to an embodiment of the invention.

Following is a brief overview of basic and doped composite spreading codes. Further detail may be found in cross-referenced and incorporated U.S. patent application Ser. Nos. 10/915,777 and 10/917,776.

Composite codes may be constructed from two to any number of constituent codes while autocorrelation of those codes is destroyed or significantly reduced by doping. For convention as used herein, a constituent code is represented by a capital letter A, B, C, etc., and elements of the codes are represented by lower case letters with subscripts, such as elements $a_1, a_2, a_3, \ldots a_N$ for code A that has a total of N elements. A lower case letter in the subscript indicates a variable number, such as $a_n$ represents an $n^{th}$ element of the code A where n varies from 1 to N. An upper case letter in the subscript indicates the final element of the code, such as $a_N$ represents the $N^{th}$ element of the code A that has N elements.

By way of example, consider two constituent codes A and B, wherein A is a first constituent code having N=ten elements and B is a second constituent code having M=ten elements. The composite code of the present invention need not be constructed from equal length constituent codes. The elements of the constituent codes may be any real or complex valued quantity, though in practice the elements are typically either $\pm j$ (where $j=\sqrt{-1}$) or $\pm 1$. The resulting composite code will include at least 100 elements, and will exhibit ten code segments each bearing ten composite elements. Additional elements may be disposed between the code segments. The first code segment is obtained by operating the first element $b_1$ of the second constituent code B with each element $a_1, a_2, \ldots a_N$ of the first constituent code A using, for example, an exclusive OR operation. Label this code segment as $Ab_1$. The second code segment is obtained by similarly operating the second element $b_2$ of the second constituent code B with each element $a_1, a_2, \ldots a_N$ of the first constituent code A to yield $Ab_e$. This continues for each of the M elements of the second constituent code, yielding ten code segments each of length ten elements. The resulting composite code is then written as AB, with exemplary code segments depicted below.

| | |
|---|---|
| $1^{st}$ constituent code A: | $A = a_1, a_2, a_3, \ldots a_N$; |
| $2^{nd}$ constituent code B: | $B = b_1, b_2, b_3, \ldots b_M$; |
| $1^{st}$ code segment: | $Ab_1 = a_1 \oplus b_1, a_2 \oplus b_1, a_3 \oplus b_1, \ldots a_N \oplus b_1$; |
| $2^{nd}$ code segment: | $Ab_2 = a_1 \oplus b_2, a_2 \oplus b_2, a_3 \oplus b_2, \ldots a_N \oplus b_2$; |
| basic composite code: | $AB = Ab_1, Ab_2, Ab_3, \ldots Ab_M$ |

It is clear from the above that each code segment has the same length N, and the composite code has M code segments arranged seriatim for a total of N*M elements in the composite code (barring the addition of further elements between code segments). It is unnecessary that the constituent codes be orthogonal to one another. So long as the constituent codes A, B, etc. are non-repetitive in their lengths, the code segments will be non-repetitive in their lengths. That is, for a composite code with segments $Ab_1, Ab_2, Ab_3, \ldots Ab_N$, arranged seriatim, each code segment $Ab_n$ is non-repetitive. A composite code wherein code segments are arranged seriatim with no intervening elements is termed herein a basic composite code.

A disadvantage inherent in a basic composite code is that its autocorrelation is poor due to the repetitive nature of the composite code AB. Sub-code A repeats (with an associated multiplier) for every element in sub-code B. Autocorrelation peaks occur at periodic intervals of 100, the length of the A sub-code. In a communication system, especially one in which security depends at least partly on covertness of communications, these peaks and their periodic occurrence could be used by an eavesdropper to decipher or jam the coded messages.

To improve the autocorrelation properties of the basic composite code, the periodicity of the code segments may be defeated by doping with a third constituent code (or with either of the original constituent codes), such as by adding elements of the third code between the Ab code segments to "randomize" the composite code and reduce the periodic autocorrelation peaks. Preferably, doping is done by inserting a non-repeating number of doping elements between each pair of code segment, or after each code segment, of the basic composite code. The doping elements are dropped at the receiver as they carry no information, and are present only to mask autocorrelation in the basic composite code. Where a third (doping) constituent code C is used as above, the elements and structure of such a doped composite code is diagrammed below, recognizing that $Ab_m$ represents an entire code sequence of a basic composite code.

basic composite code: $AB=Ab_1, Ab_2, Ab_3, \ldots Ab_M$
doping code $C=c_1, c_2, c_3, \ldots$
doped composite code: $Ab_1, c_1, Ab_2, c_2, c_3, Ab_3, c_4, c_5, c_6$, etc.

The above cross-referenced patent applications detail receivers, correlators, frequency bin searches, and various other hardware to implement composite codes. In addition to the hardware and processing savings over traditional spreading codes detailed in those cross-referenced applications, an advantage in hopping among composite codes is that they are generated at the transmitter and receiver using only the stored elements of the constituent codes. This implies that multiple different spreading codes may be generated with minimal additional memory.

More fundamentally, the entire waveform may be changed, preferably by hopping among different composite codes but alternatively or additionally by changing modulation, number of chips inserted between symbols, symbol or chip timing or phase, frame or burst structure, chip offset, error control coding, encryption scheme, scrambling code, or the like. The length of the hopped spreading codes need not be equal even on the same channel. For example, constituent codes of differing lengths may separately be used to construct two composite codes, or less than all elements of a constituent code can be used in constructing different composite codes. Besides hopping the composite code length, the symbol and chip timing may be changed, frame or burst structure, modulation and coding, and any number of system parameters may be changed with each 'hop' of a composite code. This is termed in general design code hopping, because the underlying design of the waveform may be changed according to a hopping schedule. The prior art approach of frequency or code hopping, such as that described in U.S. Pat. No. 6,657,985, is not seen as capable of changing the waveform itself due to its use of Walsh-Hadamard or Gold codes. The prior art is seen as taking different sets of individual codes from a comprehensive table of PN codes so that the code sets remain orthogonal to one another. In contradistinction, the constituent codes of the present invention need not be orthogonal to one another, so the resulting composite codes need not be orthogonal either.

The different constituent code segments may be combined by the same combinatorial logic (e.g., all exclusive OR logic) or by different logic to achieve different logic (e.g., exclusive OR versus NOR logic) to achieve different composite codes, and there is no reason that all combinatorial operations used in generating one composite code must be the same logical operation, as used in the above examples. The different constituent code segments may be stored on a computer readable media accessible by a digital controller, and combined to achieve the various composite codes by different software instructions (also stored on the media) that instruct which constituent code segments to combine, the order, and the logic to combine each pair of code segments. The hop sequence then is merely a sequence of which instruction to use at any given point in time to generate a comprehensive code. This represents a very efficient way to store and generate a high number of composite codes using little memory as compared to the prior art, which stored all spreading code elements separately. Some instructions may insert chips, some may not, and some may insert different numbers of chips between symbols as detailed below to generate different composite codes. The same constituent codes, instructions, and hop sequence may be stored in both the transmitter and receiver, so that the design-hopped spreading codes may be readily used for two-way communication during a single communication session. A single communication session is between two nodes where one allocation of transmission resources (channels) is allocated, such as one cellular phone conversation that uses discontinuous transmissions (e.g., packet communications) over a single channel allocation.

Typically, a DSS communication system will employ traffic channels and side channels for bandwidth optimization. The traffic channels are robust and have the capacity to carry large volumes of data. The side channels are for peripheral functions such as channel assignment, synchronization, handoffs, and acquisition of nodes seeking entry into the network. The above cross-referenced patent applications describe different spreading code regimens used for traffic channels as opposed to side channels, especially acquisition side channels.

Exemplary approaches for storing, addressing, and accessing different PN spreading codes from memory for use in signaling according to a PN hop sequence are detailed in U.S. patent application Ser. No. 10/610,968, incorporated above by reference. Those approaches may be used with slight modification for the present invention.

The most advantageous use of design hopping is seen to be in side channels that use less extensive spreading codes. This is because each hop entails re-constructing a new composite code. While design code hopping may clearly be implemented for traffic channels in a secure system that use a spreading code that repeats, for example, every ten or hundred years, such an underlying spreading code on the traffic channel is generally considered fairly secure and the risk of compromise is highest on the acquisition channels where an unknown node first seeks and is granted entry to the secure traffic channels. Using composite codes on the traffic channels, even with design hopping, is a design choice that the inventors regard as less secure than using a spreading code that repeats only once per hundred years.

Design code hopping is enabled by the use of field programmable gated arrays FPGAs. An FPGA is a programmable logic device such as an integrated circuit whose operation is not hardwired at manufacture, but defined by software. In the area of wireless communications, a radio operating with a FPGA is sometimes termed a software defined radio. Frequent reloading of the FPGA software/firmware to facilitate the hopping obviates the need for triple redundant and radiation hardened hardware to counter upsets due to alpha particles in space-based satellite radios. Alpha particles may disrupt the software driving the FPGA. By re-loading the software each hop, the problem is avoided without redundant hardware, and the space-based receiver is only disabled for the remaining duration of that single hop in which the software was disrupted.

FIG. 1 is a timing diagram showing the design hop concept implemented by two FPGAs 22, 24 in the same receiving entity that listen for discovery bursts on the same acquisition side channel. As detailed in the cross-referenced U.S. patent application Ser. No. 11/136,783, a transmitter seeking entry to a network on an acquisition side channel transmits a discovery burst that has a preamble and a data-carrying payload. Because the preamble is not negligible, the entity that is listening for discovery bursts preferably employs two burst receivers (embodied in relevant part as the FPGAs 22, 24) for each frequency bin as detailed below. Patent application Ser. No. 11/136,943 describes multiple burst receivers for the various frequency bins, so it is noted that the illustration of FIG. 1 relates to one frequency bin but multiple iterations of FIG. 1 may be used in a single network entity to listen in each of multiple frequency bins where unknown Doppler shifts are present. A second FPGA 24 is tuned to receive a burst according to a first code design during the receiving time span 28, labeled as $R_1$. At the termination of the receiving time period 28 labeled as R1, the second FPGA 24 then loads, during a loading period 26 designated as $L_3$, the design code for a third code design, and listens for bursts using that waveform during the receiving time span 28 labeled as $R_3$. This continues for as many iterations as may be prudent for the architecture of any particular system, and at some point the sequence $L_1$-$R_1$-$L_3$-$R_3$-$L_5$-$R_5$-... may be repeated.

The first FPGA 22 operates similarly to the second FPGA 24, but offset in time at the design code changeovers, and using different design codes. The first FPGA 22 is depicted as beginning its load period 26 for a second design code labeled $L_2$, and monitoring for a discovery burst according to that second design code during a receiving period 28 labeled as $R_2$. The loading period 26 designated as $L_2$ is within the receiving period 28 for the first time period $R_1$ at the second FPGA 24. Following termination of its own receiving time period 28 labeled $R_2$ for the second design code, the first FPGA 22 loads the software to receive bursts that comply with a fourth design code during the loading period 26 labeled as $L_4$. Once loaded, the first FPGA 22 listens, during the receiving time period 28 labeled as $R_4$, for discovery bursts that use the fourth design code. This hopping of design codes continues to the loading period $L_6$ and receiving time period $R_6$, and may continue further or repeat the illustrated hop sequence to re-use the same codes.

It is clear that the FPGAs 22, 24 are temporarily unable to listen for a discovery burst during the loading time 26 when they are reconfiguring software to receive according to the waveform (different composite code, timing, phase, etc.) of a different design code. Additionally, the preamble of a discovery burst may begin immediately prior to a code changeover, for which the timing diagram of FIG. 1 shows adequate overlap among the two FPGAs to receive such a discovery burst. In FIG. 1, a transmitter communicating a discovery burst operates according to the same hop sequence as the overall sequence illustrated for the two receiving FPGAs 22, 24. After a second time 30, the transmitting node sends according to the second design code, and the first FPGA 22 is tuned to receive according to that design code. After a third time 32, a hailing node sends a discovery burst according to the third design code, when the second FPGA 24 is tuned to receive it. The same continues for each time instant 34, 36, 38 at which a new design code is loaded and a FPGA 22, 24 is tuned to receive it. The hop sequence must be infrequent enough that a burst preamble 40, transmitted immediately prior to a time 32 at which a design code is to hop at one FPGA 24, is received by the other FPGA 22 before that other FPGA 22 begins its next loading period 26. While the loading time varies depending upon the composite code length to construct, the examples given below yield a load time somewhat shorter than the burst preamble, so this restriction is easily met.

When the present invention is implemented on a side channel, preferably it is on one or both of a synchronous and an asynchronous side channel. Assume that the hailing node sending a discovery burst and a network entity listening for the burst have clocks synchronous to within 1 millisecond (msec), and that design code hopping occurs at the hop interval 42 about every 200 msec based on a 1200 b/sec bit rate and 20.4 Mega chips/sec chip rate that yields a discovery burst duration of about 450 msec. The chip rate on the side channels is a fraction of that on the traffic channels. The node and entity may synchronize their local clocks with a common source such as a GPS clock signal or a timing signal sent from the entity or another node, as known in the art. A compromised hailing node (e.g., an unauthorized party records and re-transmits a burst from a legitimate hailing node) will then compromise the synchronous side channel for a maximum of only one hop interval, 200 msec in this example. After that, the legitimate hailing node has hopped its design code and the unauthorized party cannot record the next 200 msec portion of the burst for playback unless it also knows the design code hop pattern and transition times. Driving the hop interval 42 to be shorter than the discovery burst (200 msec versus 450 msec in this example) ensures that the design code hopping protects the discovery burst. The lack of perfect clock synchronization may be accounted for by the hailing node inserting a 1 msec delay 44 at each design code transition, as shown in FIG. 2A. Data is then transmitted only during a subset 46 of each hop interval 42, which is the hop interval 42 minus the delay 44.

FIG. 2B illustrates similar to FIG. 2A, but for representative time periods for an asynchronous side channel where the maximum or expected error in clocks between the hailing node and network entity is much greater. Assume for FIG. 2B that the maximum error between clocks is 158 sec. Using the bit and chip rates as in FIG. 2A, the design code hopping cannot split a 450 msec discovery burst among different hops of the design code because even the delay period 44, at 158 sec, is too long. A hop interval 42 of 100 minutes is selected for FIG. 2B somewhat arbitrarily. While a discovery burst in the scenario of FIG. 2B may be copied and re-transmitted by an unauthorized party, the fact that the asynchronous side channel is likely to be used much less frequently provides some security against interception. In any event, the unauthorized party must re-transmit within the proper 100 minute hop interval 42 to be received by the listening network entity, which the unauthorized party does not know absent the design code hopping pattern and transition times.

FIGS. 3A-5B illustrate correlations of different composite codes used in design code hopping, selected using the following criteria. The processing gain is arbitrarily chosen to be 15,151, implying a nominal symbol rate of 1346 b/sec. All composite codes of the hopping pattern are selected to produce a symbol rate within 1% of that nominal symbol rate, so variance of code length is constrained somewhat arbitrarily. Each composite code is constructed as above from four constituent codes A, B, C and D. For the first composite code, A=15, B=11, C=7, and D=13, yielding a length for the first composite code of 15,151. For the second composite code, A=14, B=12, C=7, and D=13, yielding a length for the second composite code of 15,288.

Figure 3A:
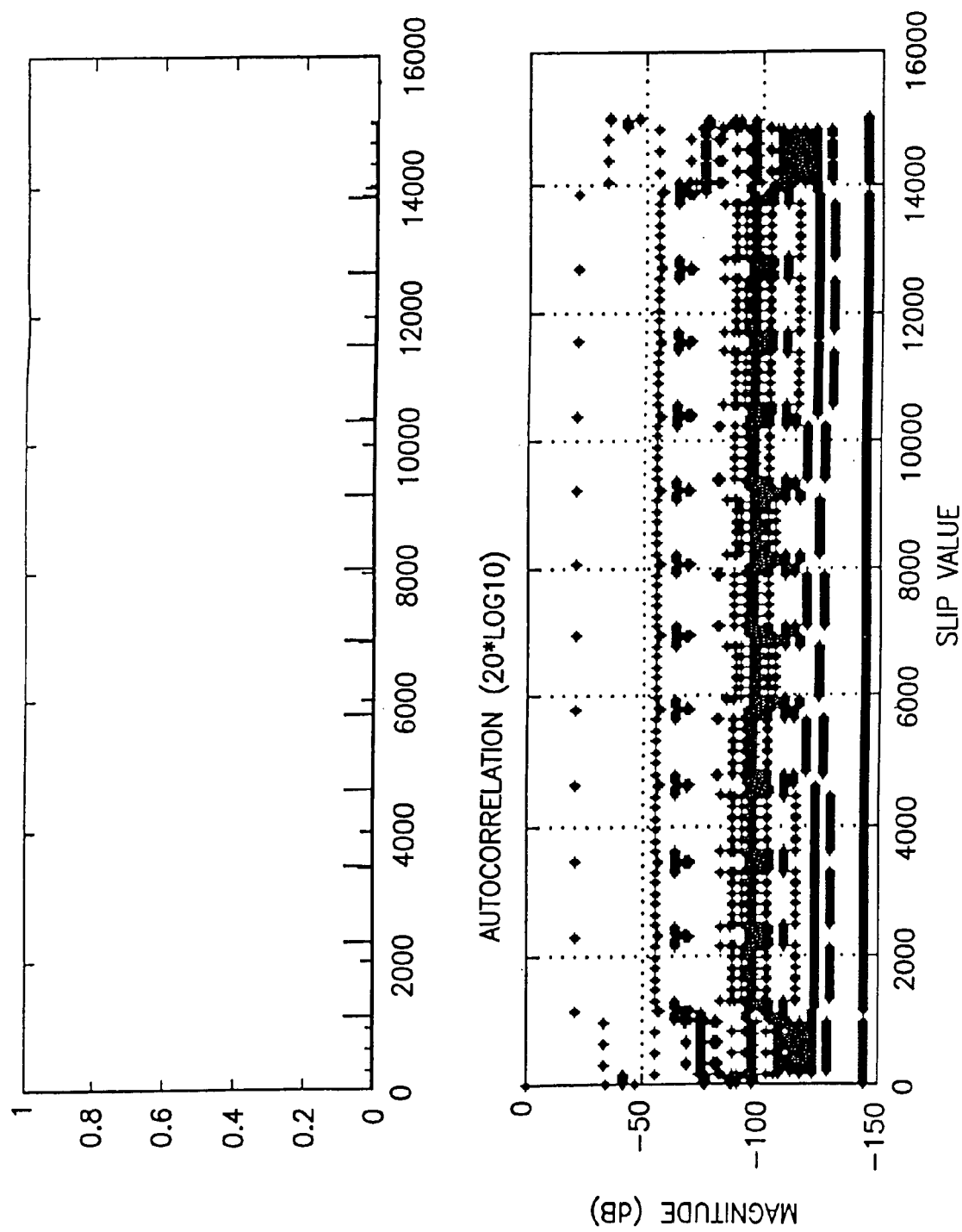
FIG. 3A is a pair of graphs depicting autocorrelation of a first composite code of length 15, 015 used in an exemplary embodiment.
Figure 3B:
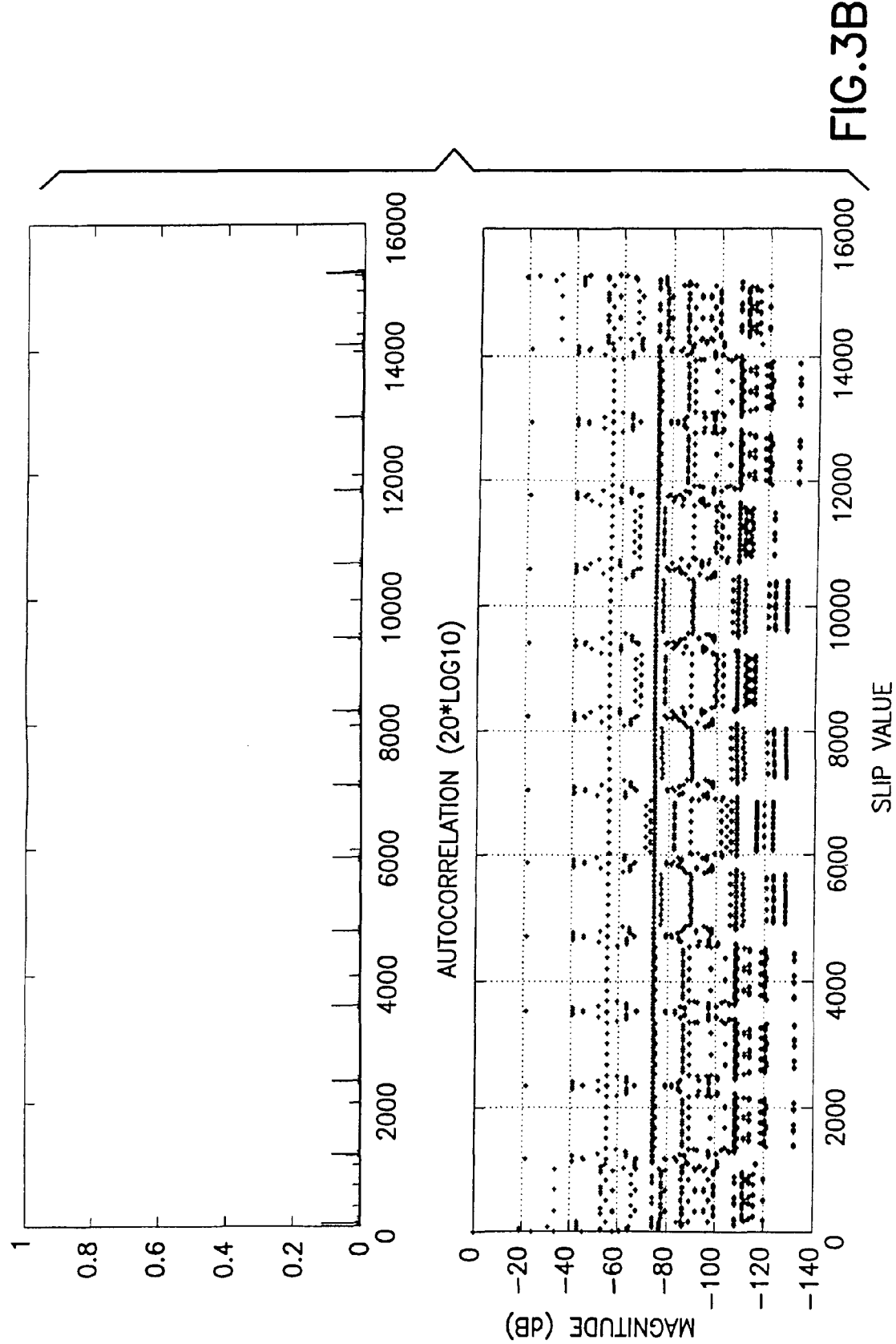
FIG. 3B is similar to FIG. 3A, but for a second composite code of length 15,288.

FIG. 3A shows autocorrelation of the first composite code in the lower graph, with slip values for each 15,151 elements along the horizontal and magnitude of autocorrelation along the vertical. Maximum sidelobes occur at −21.58 dB, and the autocorrelation peaks are plotted separately in the upper graph. FIG. 3B shows similarly for the second composite code for its 15,288 slip values, where the maximum sidelobes occur at −19.8 dB.

Figure 4A:
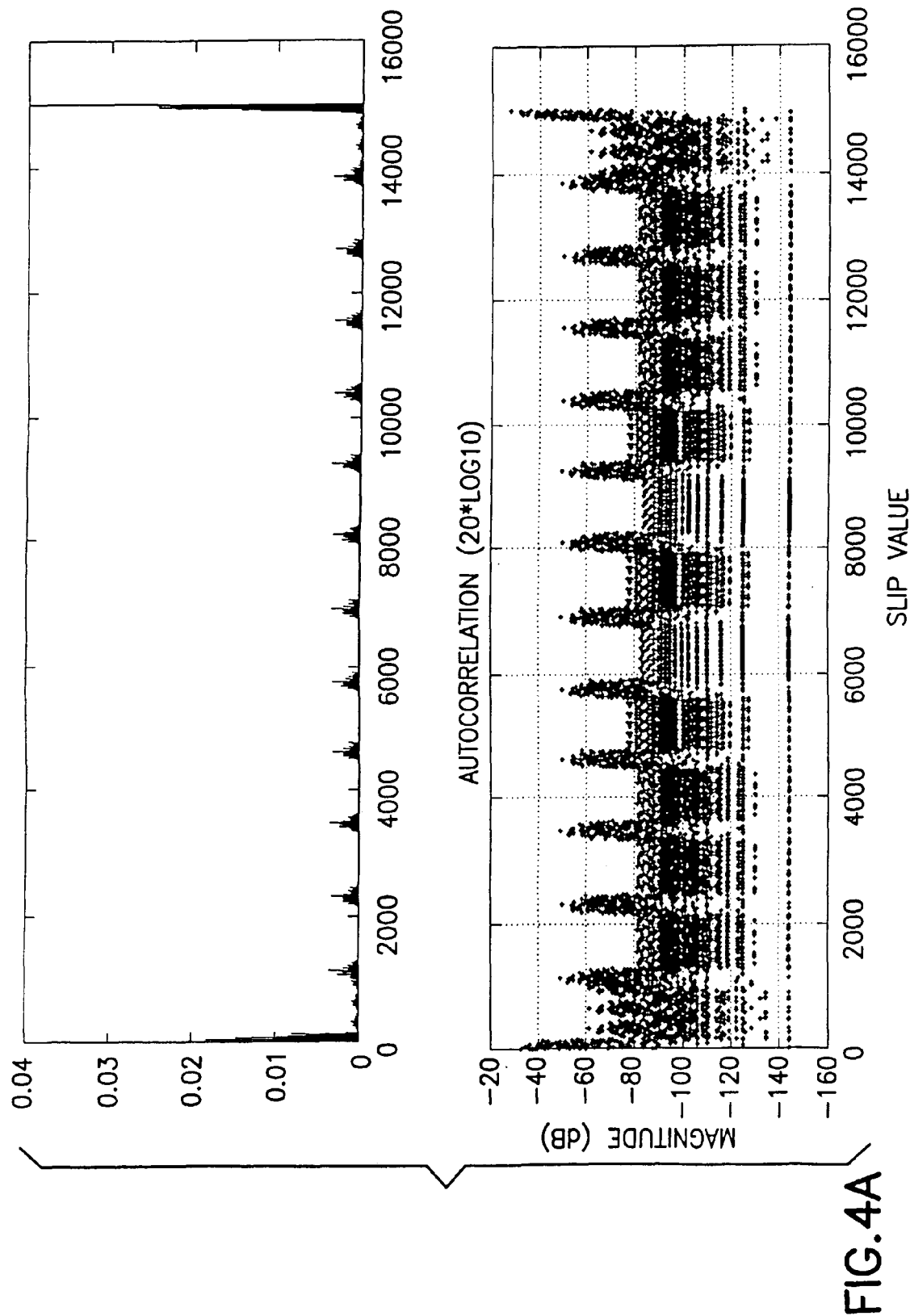
FIG. 4A is a pair of graphs showing cross correlation of the code of FIG. 4A with a permuted structure version of itself.
Figure 4B:
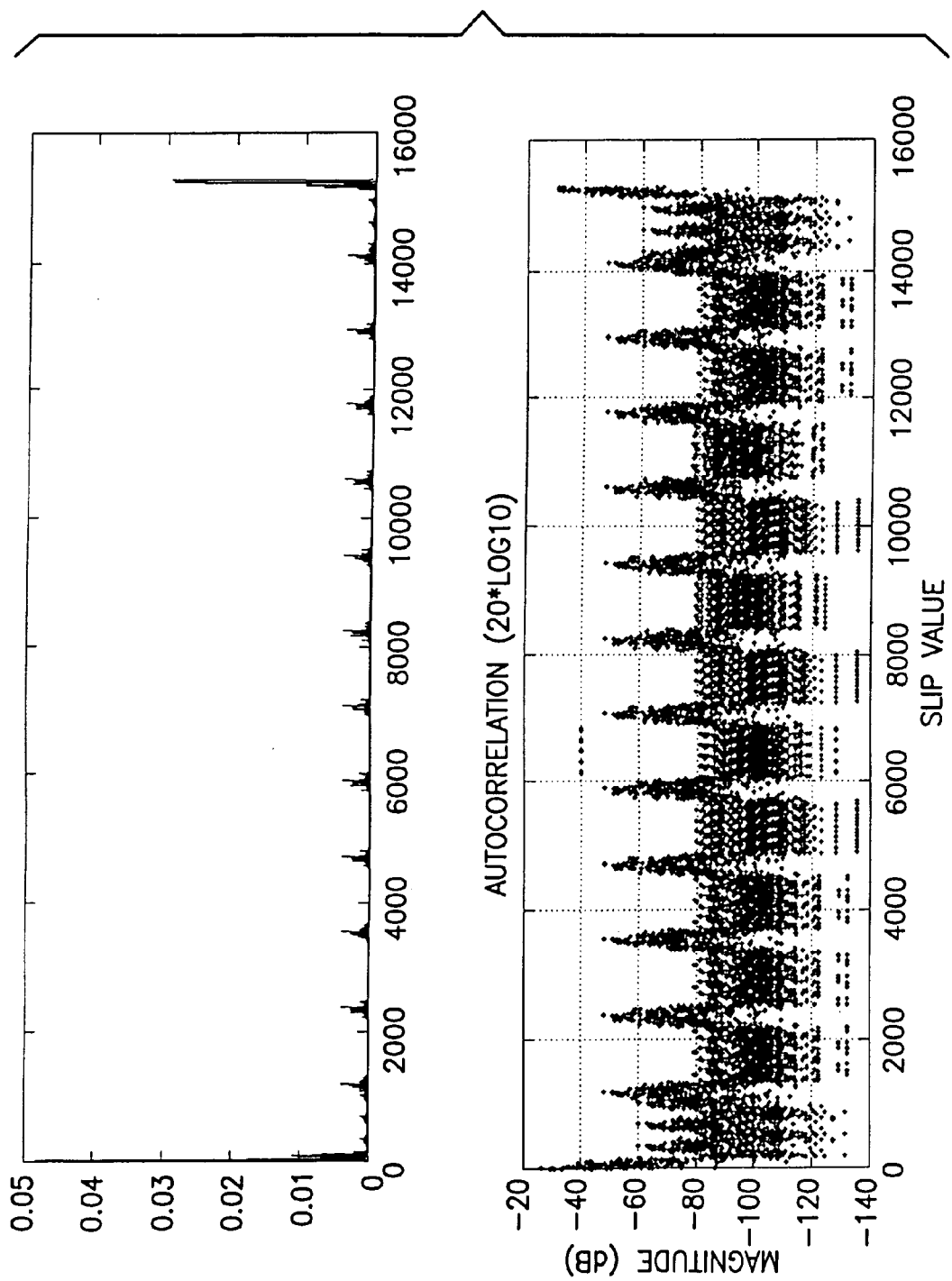
FIG. 4B is similar to FIG. 4A, but for the code of FIG. 3B.

FIG. 4A shows cross-correlation of the first composite code with a permuted version of itself. In this instance, the permuted version is merely reversing the order of constructing the first composite code, using the same constituent codes as the original first composite code but in the order B, A, C, D. The maximum sidelobes at −28.20 dB are closer to the noise ceiling than the autocorrelation peaks as would be expected, but all of the cross-correlation peaks are very well defined indicating an increased potential for interference with one another. Cross-correlating the second composite code with a permuted version of itself is plotted in FIG. 4B, where the permuted version of the second code uses its same constituent codes but constructed in the order B, A, C, D as with FIG. 4A. The maximum sidelobes for FIG. 4B are at −26.33 dB, and the cross-correlation peaks are again well defined. Thus, different composite codes that differ only in the order of combining constituent code segments are not the best choice, because the high cross-correlation would tend to cause interference among signals transmitted with the permuted codes. Of course, permuting some constituent code segments and changing another factor, such as another constituent code used in making the composite code, destroys that high cross-correlation.

Figure 5A:
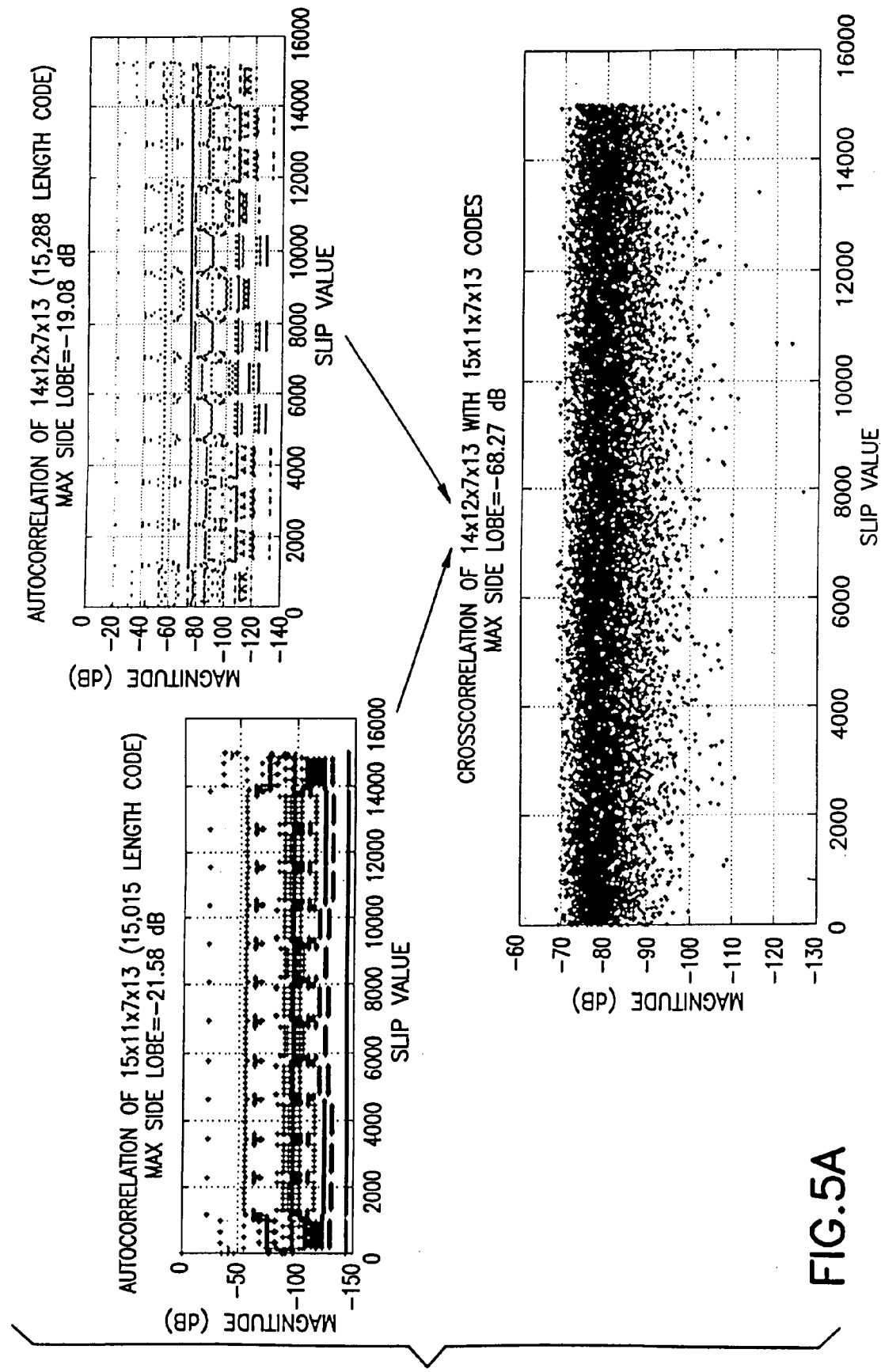
FIG. 5A is a graph showing cross correlation of the code of FIG. 3A with the code of FIG. 3B, with reference to the autocorrelation graphs of those Figures.
Figure 5B:
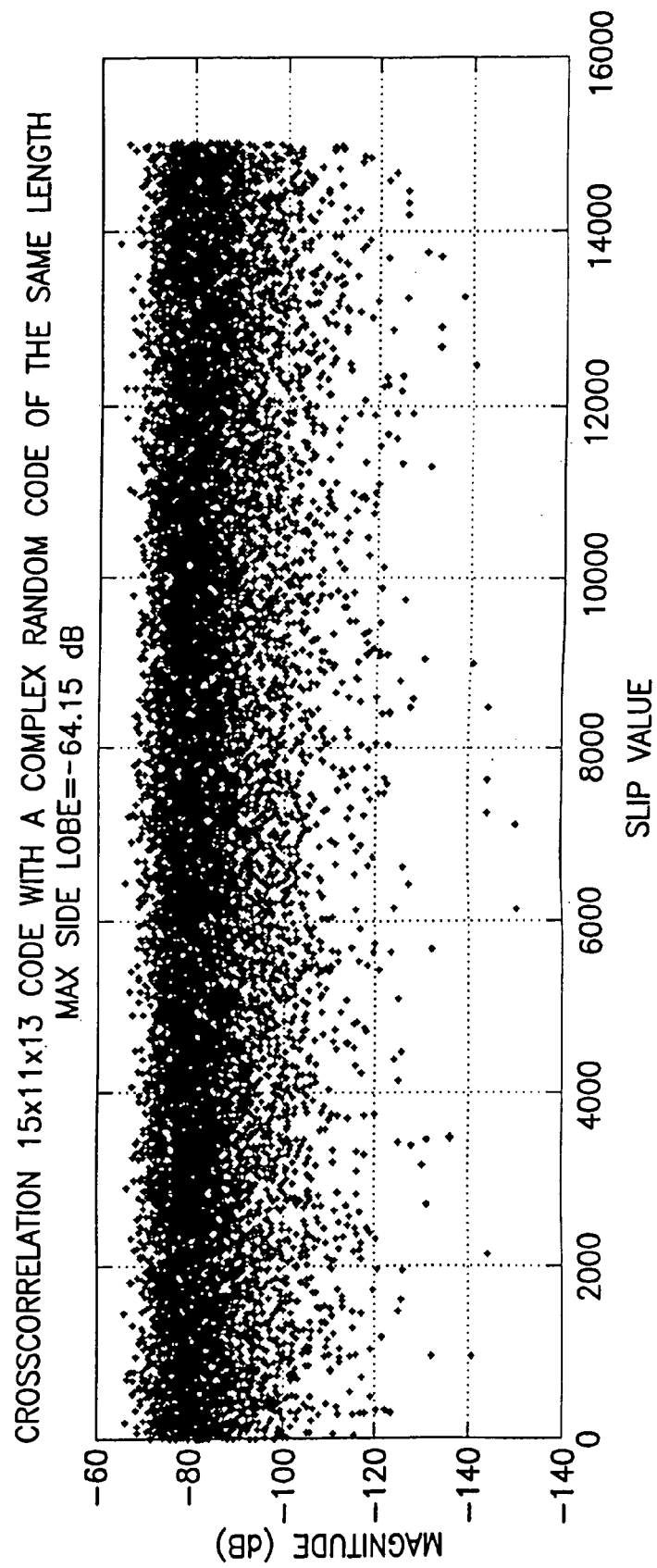
FIG. 5B is a cross correlation of the composite code of FIG. 3A with a random code of the same length, as a comparison of random noise against FIG. 5A.

FIG. 5A shows cross-correlation of the first and second composite codes, with their separate autocorrelation graphs of FIGS. 3A and 3B repeated above the cross-correlation graph at the lower portion of FIG. 5A. The maximum sidelobes are at −68.27 dB, very close to the noise ceiling indicating a lowered probability of detection, because any cross-correlation peaks are well buried in noise. As a comparison, FIG. 5B shows cross-correlation of the first composite code with an unrelated complex random code of the same length. In FIG. 5B, any cross-correlation (max sidelobe −64.15 dB) occurs by happenstance. A comparison of FIGS. 5A with 5B shows that using composite codes of nearly the same length, but each constructed from a different set of constituent codes, will give little if any cross-correlation pattern by which signals might interfere with one another.

Because the above treatment of the two composite codes shows that merely permuting a code by re-arranging the order of combining its constituent codes is not the most attractive option, we are left with a fairly limited set of composite codes to use in the design code hopping pattern. Given the constraints detailed above immediately prior to the discussion of FIGS. 3A-5B (15,151 length; ±1%; 4 layer codes only), and further constraining the C code to lie between 10 and 15 elements, there are 251 distinct composite codes that may be constructed, excepting permutations by re-ordering a combination of constituent codes. Those 251 codes vary in length between 15,000 and 15,300. Using the 200 msec hop interval noted above with reference to FIG. 2A and a synchronous side channel, using all of these 251 codes in a design code hop would result in the same design repeating about every 50 seconds. One obvious way to increase the number of composite codes available for design code hopping is to allow the processing gain to vary by more than ±1%. A more elegant technique is detailed below that does not expand tolerance on the processing gain.

Some of the cross-correlation peaks can be diminished by adding one or more chips to the composite code at the beginning or end of every symbol. This will change the processing gain and cause the composite code's autocorrelation to 'walk' relative to a search engine of the wrong length, frustrating attempts to detect the code by autocorrelating signals that stand out against noise. To adapt the hardware described in the cross-referenced applications to such a variation the accumulation registers need to be lengthened by the corresponding number of added chips, as detailed below with respect to FIGS. 8-11. First, FIGS. 6A-7B are described to quantify the advantage.

Figure 6A:
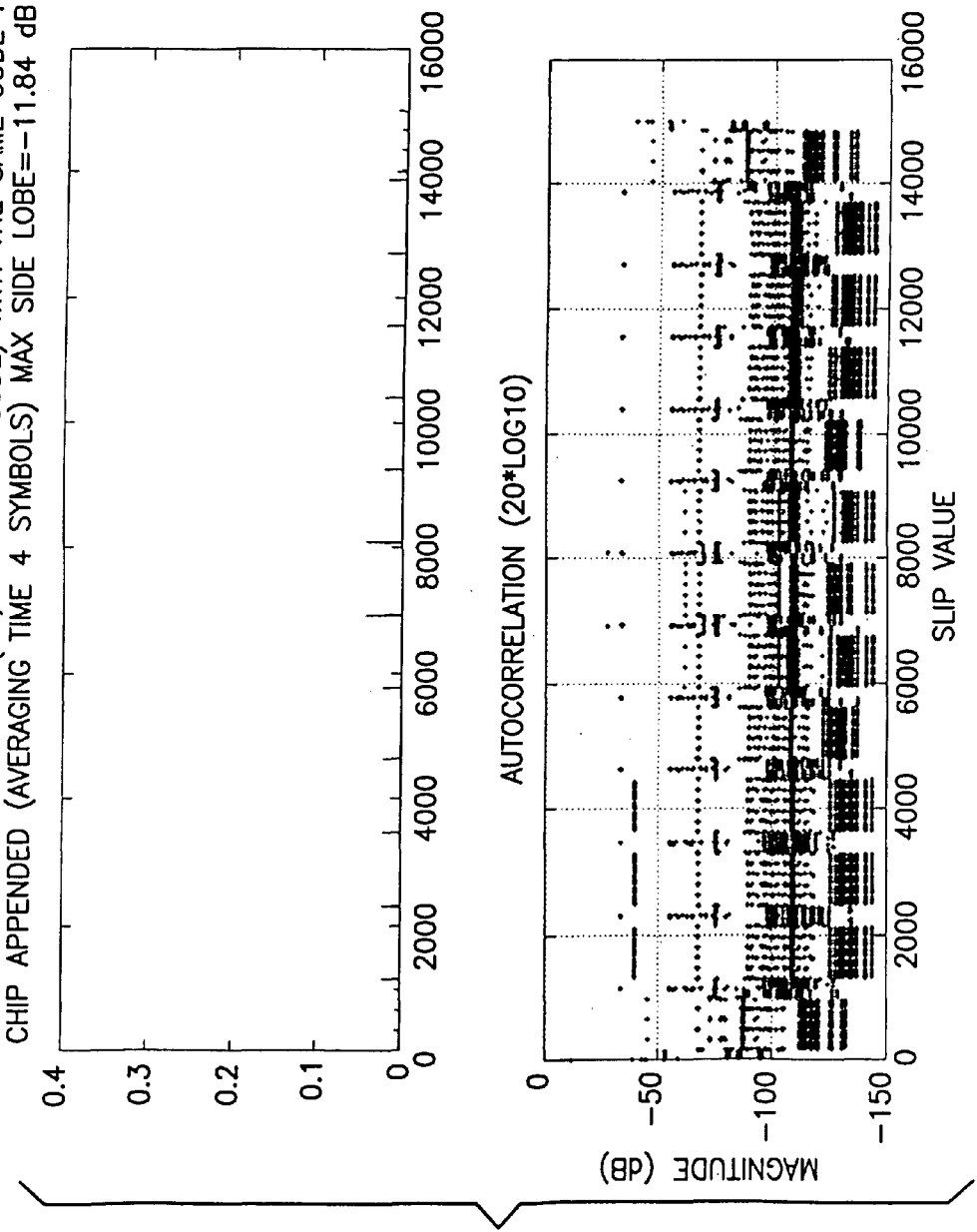
FIG. 6A is a cross correlation of the code of FIG. 3A cross correlated with the same code having one chip appended, and an averaging time of 4 symbols.
Figure 6B:
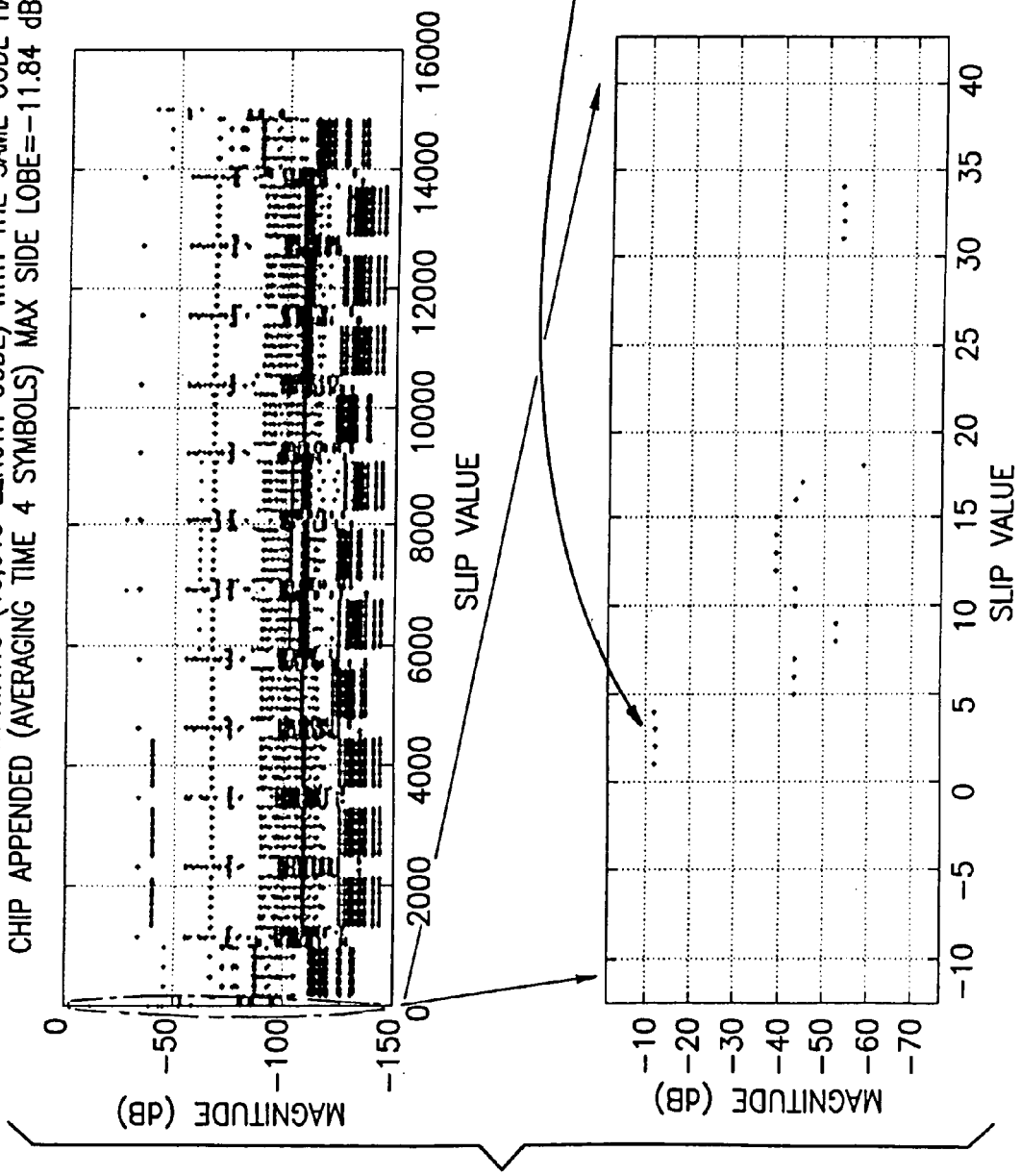
FIG. 6B is a repetition of FIG. 6A, but with a lower graph showing further detail of the highest cross-correlation peak and its reduction by adding chips.

FIG. 6A is a two part graph, similar to that of FIG. 3A, but showing cross correlation of the first composite code (constituent code lengths) A=15; B=11; C=7; and D=13) with the same composite code having one chip added after each symbol, and an averaging time of four symbols. FIG. 6B is the same graph, but with an additional detailed lower graph showing individual points of the encircled portion for further detail. A code autocorrelated with itself would exhibit an autocorrelation peak of zero dB at the first chip, as shown in FIGS. 3A and 3B. In FIG. 6B, the code is autocorrelated with itself with the exception that one of the codes has appended chips. As is flagged in FIG. 6B, the autocorrelation peak is reduced by about 12 dB merely by adding a chip after each symbol.

Figure 7B:
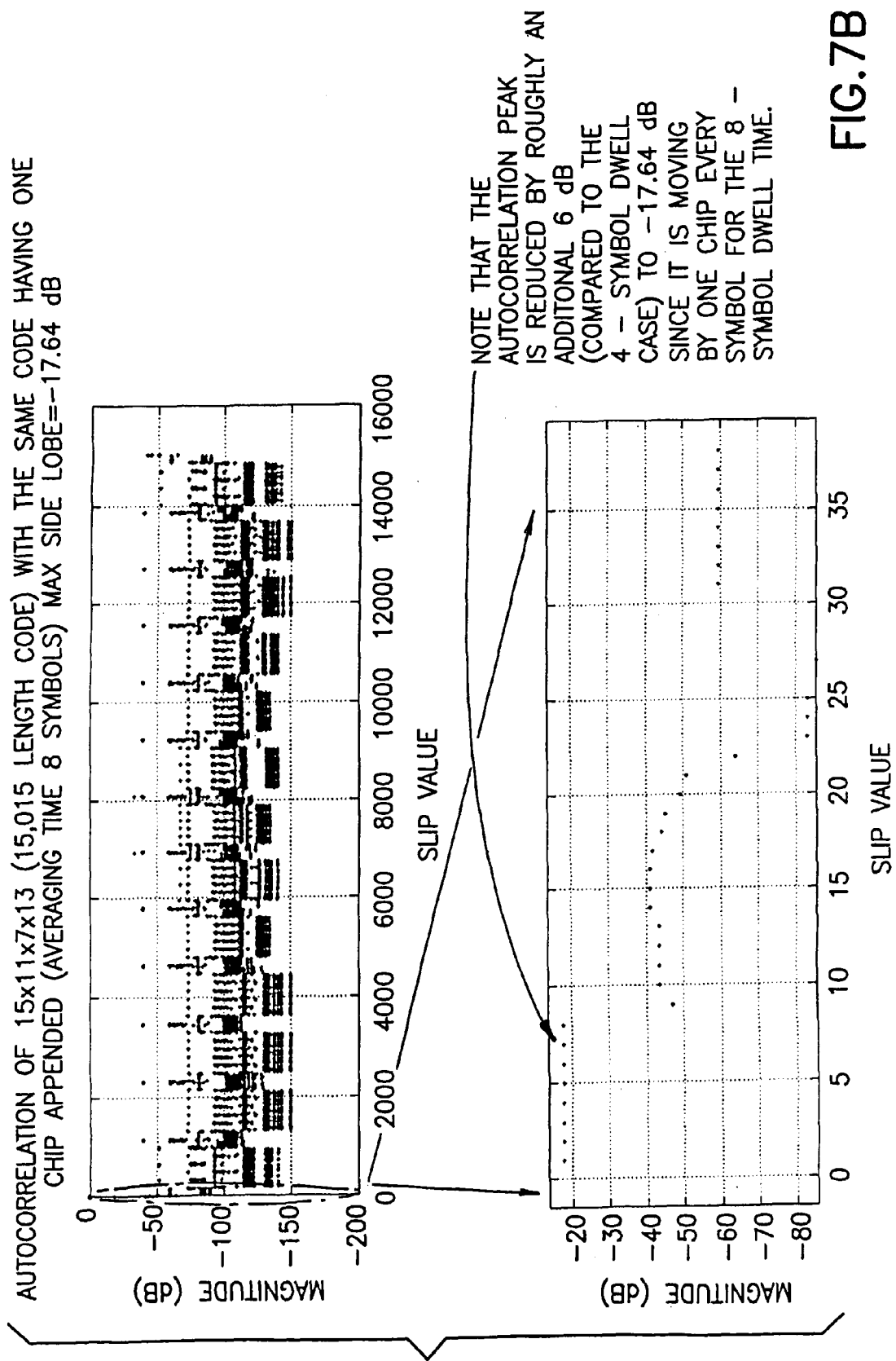

FIGS. 7A-7B are similar to FIGS. 6A-6B, but using an eight symbol averaging time. The autocorrelation peak at the first chip is −17.64 dB, an improvement of about 6 dB over the peak autocorrelation value shown in FIG. 6B.

As noted above, the purpose of appending chips to the basic (non-appended) composite codes is to expand the number of available codes that can be used for design code hopping, as repeating the overall hop sequence every fifty seconds is not seen as optimum, and expanding beyond ±1% of the nominal processing gain would necessitate an increase in hardware for processing. The cross-correlation analysis of FIGS. 6A-7B shows that the additional codes that may be added by appending chips after each symbol are viable from a code security perspective. Further analysis, not presented herein, shows that the worst-case cross-correlation sidelobes drop at a rate of 20 log(N), where N is the dwell time for the search engine processor. Using N=100 symbols, the worst-case cross-correlation sidelobe drops about 40 dB.

In determining the number of codes we can hop between while remaining within 1% of 1% of the nominal processing gain, there is no requirement that only one chip can be appended after each symbol; the operative limit is ±1% of the nominal code length (15,151 in the example). As detailed above, there were 251 different composite codes when the limiting parameters were 15,151 nominal code length, ±1% of code length, and a length of the C constituent code between ten and fifteen. Since there are 303 valid processing gains within ±1% of the 15,151 composite code length, we can append 0, 1, 2, . . . 302 chips to the shortest design code length and still remain within 1% of the 15,151 length. The longest length cannot be appended at all without exceeding 15,151+1%. Therefore, the number of unique composite codes within the above constraints is (251*303)/2, or 38,026 unique composite codes that are available for design code hopping. Hopping every 200 msec yields a design that repeats about every 2.11 hours (rather than every 50 sec. when hopping among only 251 unique codes). If we extended the code length limits from ±1% of code length to ±2% of code length, the design code would repeat every 8.45 hours.

Figure 8A:
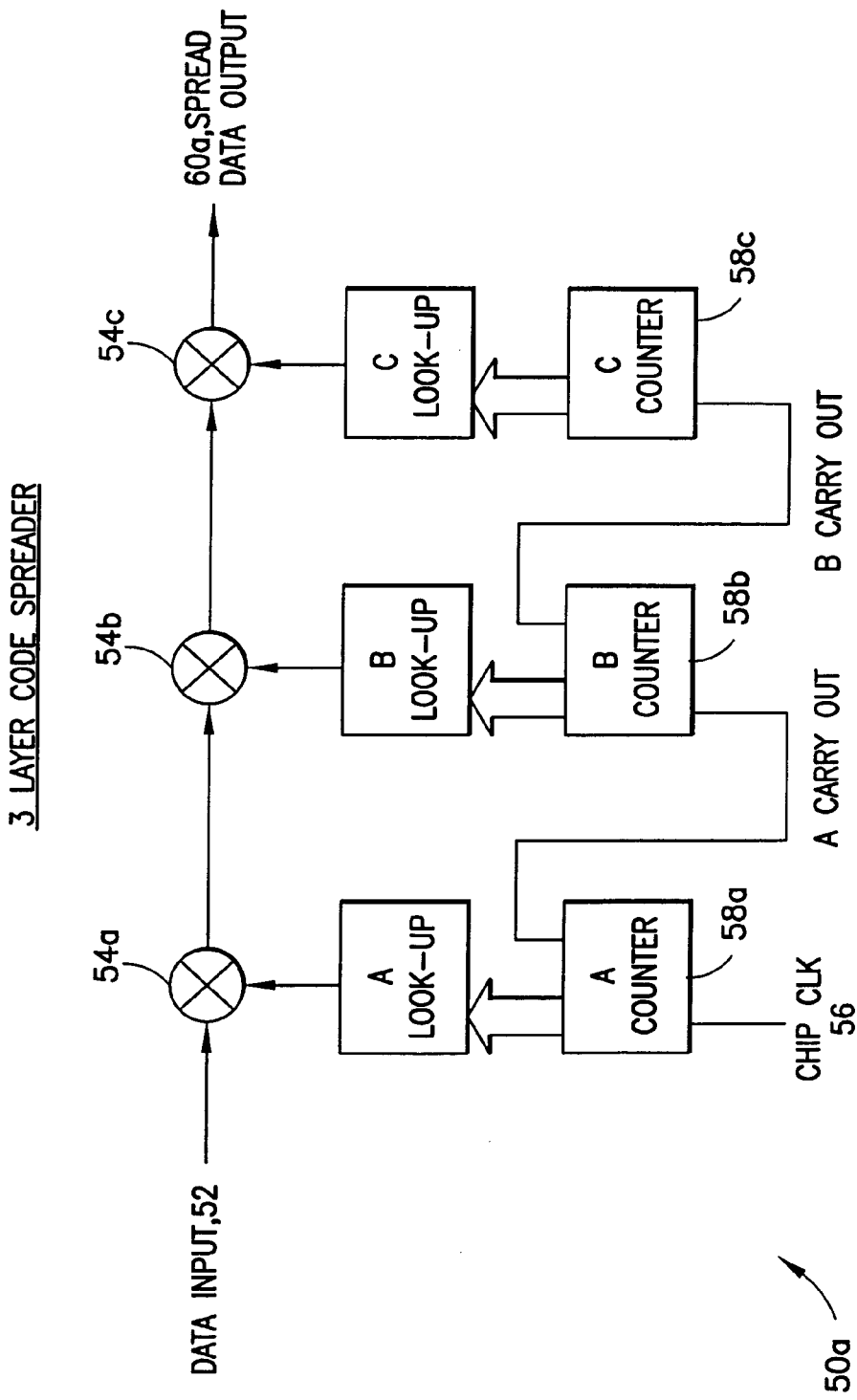
FIG. 8A is a schematic block diagram of a spreader configured for spreading with a composite code made from three constituent codes.

Exemplary hardware to implement the above design code hopping is shown in FIGS. 8A-9B. FIG. 8A is a schematic block diagram of a spreader 50a for implementing a composite code in three layers, made from constituent code A, B and C. Data to be transmitted is input at an input port 52a, and at a first multiplier 54a that data is multiplied by the A constituent code elements one by one, as spaced by a chip clock 56. A first counter 58a carries out the A constituent code to a second counter 58b, and at a second multiplier 54b the data (which is at the input spread only by the A constituent code) is further spread by the elements of the B constituent code. The same process continues iteratively so that at a third multiplier 54c, the data (which is at that input spread by both the A and B constituent codes) is spread by the elements of the C constituent code. The output 60a is then the input data spread by the composite code ABC. Note that the B and C counters 58b, 58c, are clocked (advanced) only during carry over of the previous spreader. The B counter 58b increments once each completion of the A constituent code. The C counter increments once each completion of the B constituent code.

Figure 8B:
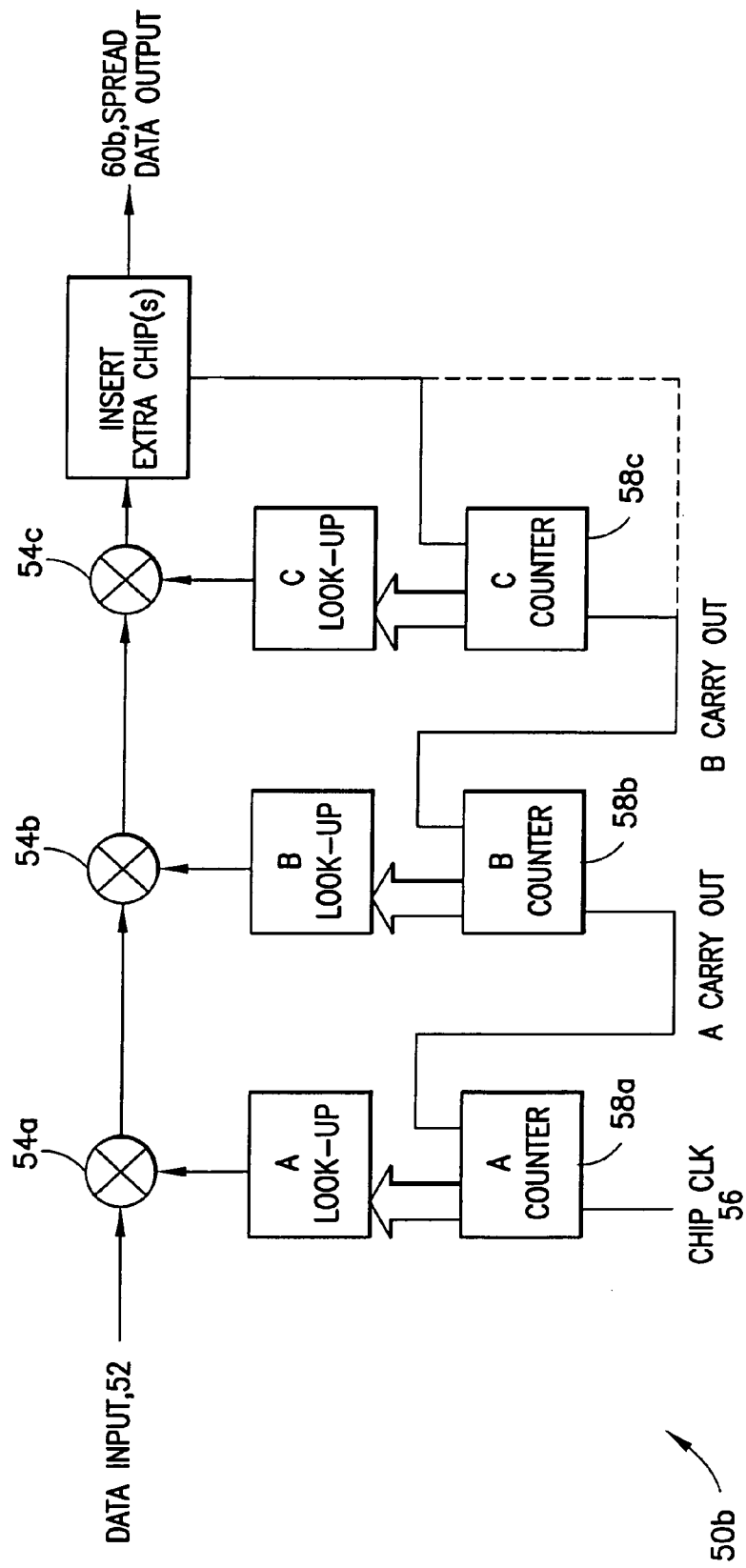
FIG. 8B is similar to FIG. 8A, but adapted to append extra chips.

FIG. 8B adapts the spreader 50a of FIG. 8A to append chips as detailed above, where like reference numbers indicate like components and operation. The appended chip spreader 50b differs in that an extra chip (or multiple extra chips) is inserted at completion of the C and B codes on the C and B carryouts. While appending chips only on the C code carryouts may be simpler, only one to n additional chips may be inserted per symbol. Appending chips also at the B code carryouts inserts C to Cn extra chips per symbol. While this represents more bits inserted, it yields a lower cross correlation between the AB code and the AB code with appended chips.

Figure 9A:
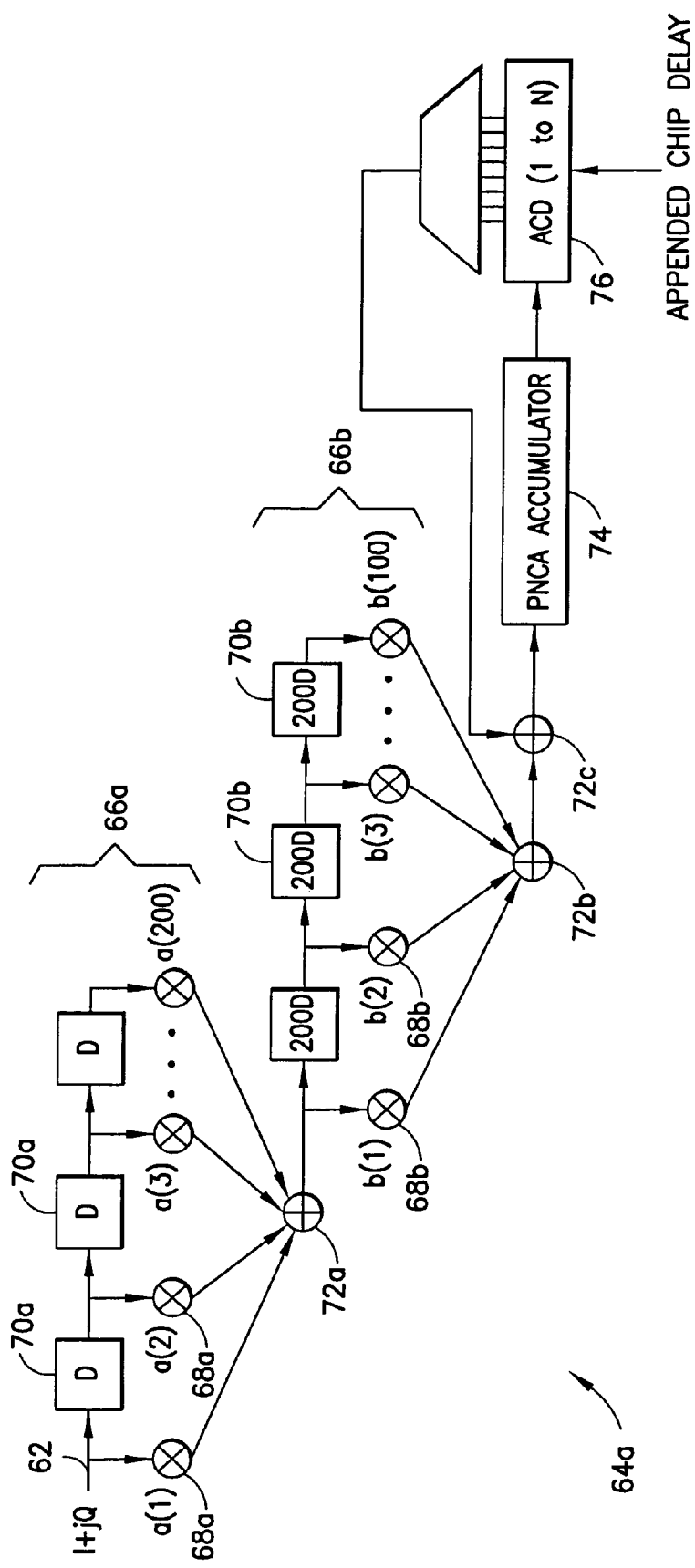
FIG. 9A is a schematic block diagram of a correlator adapted to despread while removing appended chips at the PNCA accumulator.
Figure 9B:
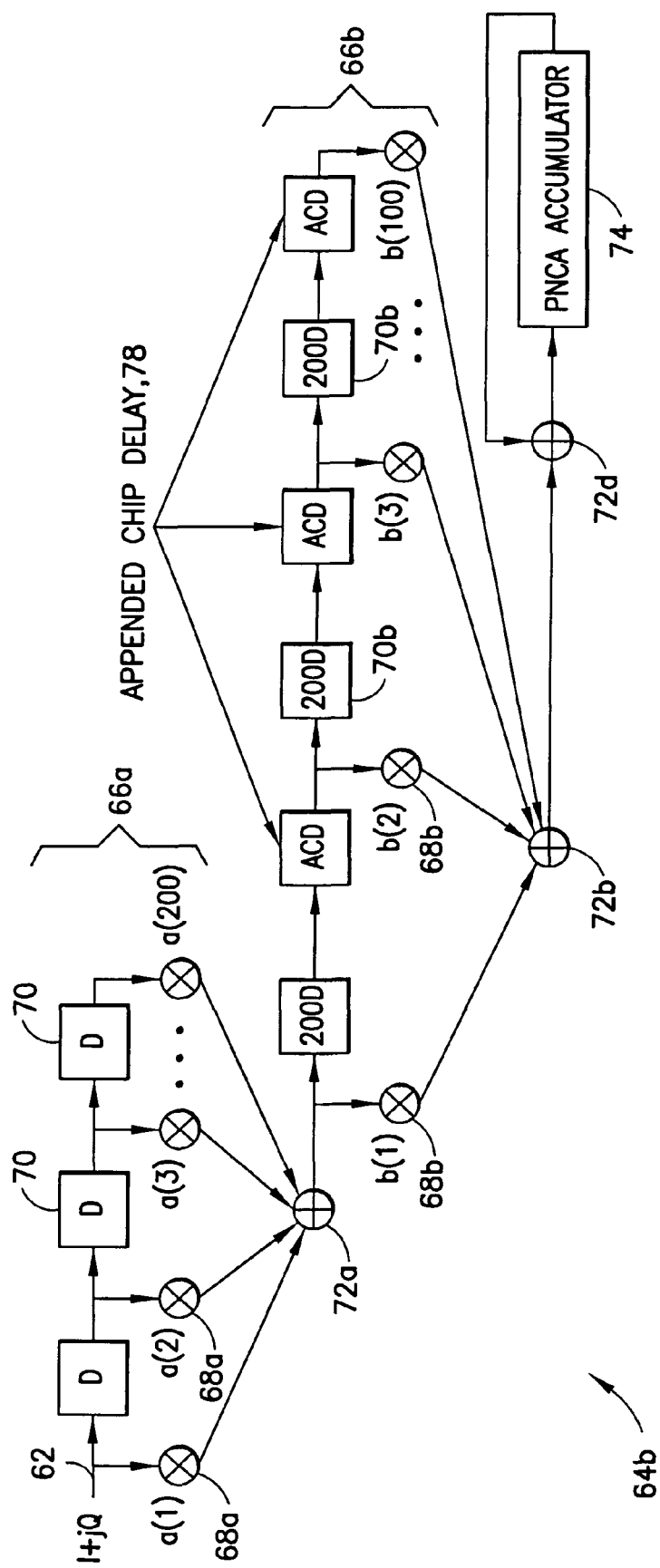
FIG. 9B is similar to FIG. 9A, but adapted to remove the appended chips while despreading one of the constituent codes.

FIGS. 9A-9B illustrate two embodiments of relevant portions of a correlator that may be used to despread a signal spread with a composite code using appended chips. Hardware is shown for a two-level correlator (corresponding to a composite code constructed from two constituent codes), but may be readily expanded to any number of levels commensurate with the composite code in use at the time. Further details of a correlator used for dispreading a signal spread with a composite code are given in the cross-referenced and incorporated U.S. Patent Applications, especially Ser. Nos. 10/915,776 and 10/915,777; FIGS. 9A-9B particularly show adaptations to those disclosures to facilitate dispreading with appended chips. A complex received signal 62, after demodulation and conversion to digital, is input to a correlator that may be according to the prior art, or preferably may use a multi-level correlator 64a or 64b as in FIGS. 9A-9B. At a first level 66a, a series of taps 68 each multiply a slip value of the input data 62 by an element of one of the constituent codes (elements a of the A code as illustrated). The taps are separated by delay elements 70a (unit delay elements for this first level 66), and the values from the multipliers 68 are summed at a first level summing junction 72. The output of the first level summing junction 72 serves as an input to a second level 66b, which differs from the first level 66a in that, at the second level 66b, the taps multiply by elements of a different constituent code (elements b of the B code as illustrated) and the delay elements 70b space the slip values for the proper positions of slip values corresponding to the elements of the second constituent code in their expected positions when aligned, corresponding to the lengths of the A and B constituent codes. These results are summed at a second level summing junction 72b. In accordance with the cross-referenced and incorporated patent applications, the result after the final level of spreading and summing is entered into a PNCA accumulator 74 where an energy spike indicates code alignment. With the present embodiment of FIG. 9A, the PNCA accumulator 74 is extended beyond the length of the composite code itself by an appended chip delay 76. Where the composite code of length AB is despread by a length AB PNCA accumulator 74, the addition of appended chips would cause the appended code to walk across such an accumulator 74, and never show an energy spike indicating alignment. The appended chips are fed back and added to the output of the final (second) level summing junction 72b at an appended chip adder 72c which removes the appended chips and allows an energy spike to form when the unappended composite code AB is aligned in the PNCA accumulator 76. It is noted that the embodiment of FIG. 9A inserts only one set of appended chips (1 to n) per symbol. Additional iterations of the appended chip delay 76 are used to remove more than one chip per symbol using the same technique but a longer appended chip delay 76 to supplement the PNCA accumulator 74.

The multi-level correlator 64b of FIG. 9B yields the same result by a different embodiment. The first level 66a operates identical to that of FIG. 9A, but unlike that embodiment, the embodiment of FIG. 9B uses a PNCA accumulator 74 of length AB for despreading a composite code of length AB. The delay elements 70b of the final (second) level are identical to those of FIG. 9A, but an appended chip delay element 78 follows each of the final level delay elements 70b and the tap multipliers 68b for this level 66b operate on the slip value output from the appended chip delay elements 78. Just as the appended chip delay 76 of FIG. 9A extended the length of the PNCA accumulator 74, the appended chip delay elements 78 of FIG. 9B extend the delay imposed by the final level delay elements 70b in the embodiment of FIG. 9B. This embodiment avoids the B constituent code from walking across the second level summing junction 72b, so the input to the (typical) PNCA accumulator 74 is aligned when the code is aligned, and the expected energy peak arises. Where the normal length of the second level delay elements 70b would be the length of the A constituent code (200 in the illustration of FIGS. 9A-9B), the embodiment of FIG. 9B extends that delay by one chip for each B code element being despread. Of course, where more than one chip is appended, the amount of the appended chip delay in the second level 66b of FIG. 9B is correspondingly increased. The additional adder 72d of FIG. 9B is for a feedback loop as described in cross-referenced patent application Ser. No. 10/915,777. Thus it is evident by FIGS. 9A-9B that the appended chips are resolved in despreading merely by increasing the length of the PNCA accumulator or by increasing delays in despreading a constituent code.

Figure 10A:
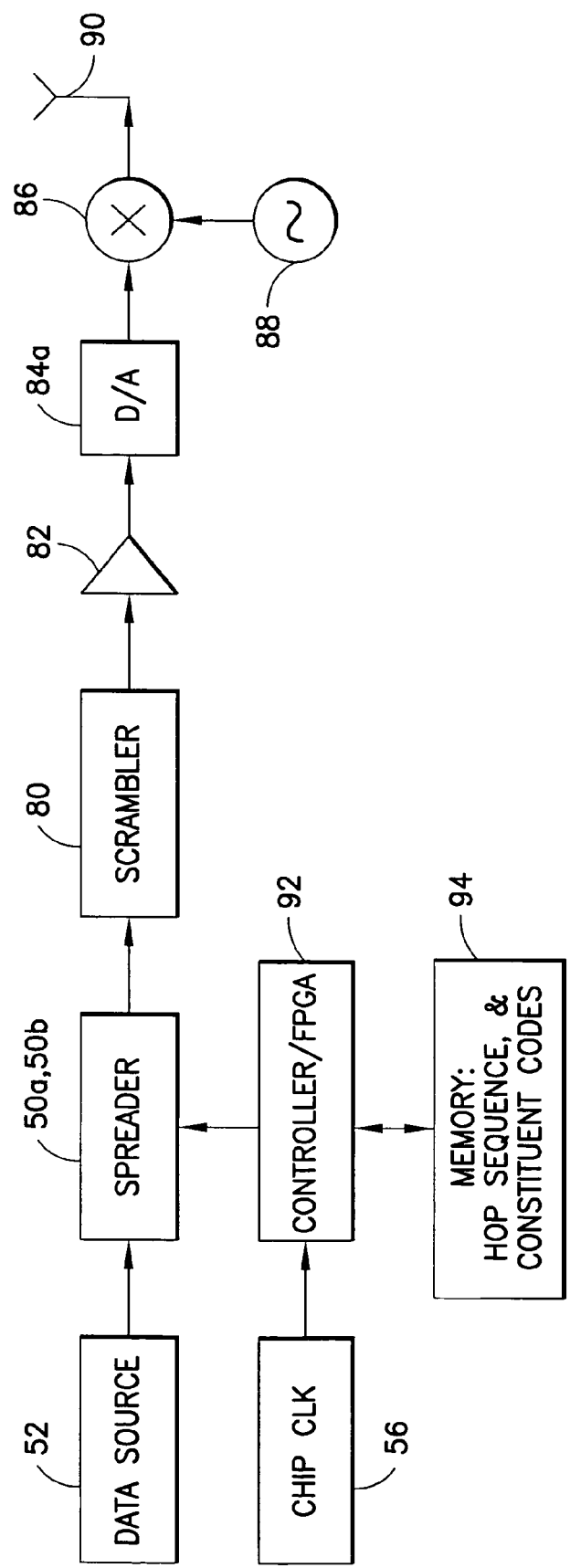
FIG. 10A is a schematic block diagram of a transmitter in which either of the spreaders of FIGS. 8A-8B may be disposed.

Context for the spreaders 50a, 50b of FIGS. 8A-8B is shown at FIG. 10A, which is a schematic block diagram of relevant portions of a transmitter. A data source 52 provides the input to the spreader 50a, 50b, and its output is scrambled 80 with a scrambling code as well known. The spread and scrambled signal is then amplified 82, converted to analog at a converter 84a, multiplied 86 onto a modulating wave 88, and transmitted at an antenna 90. The spreader 50a, 50b is controlled by a controller 92 such as a digital signal processor or a field programmable gated array FPGA, for example. The chip clock 60 controls synchronization of all relevant components through the processor 92. Stored in a memory 94 are the constituent codes, and tables or algorithms as to how they are to be combined to result in the desired composite codes that spread the signal. It is noted that the constituent codes themselves need not be combined; the result of applying the constituent code elements in a particular manner to the source data 52 results in a composite code applied to the source data 52. Also stored in the memory 94 is a computer program that directs the hopping sequence; how often to hop, what variables of the waveform to change on each hop, how to change them, etc. As described above, the composite spreading code may be changed at each hop interval, but also phase and modulation may be hopped as well as other parameters in design code hopping.

Figure 10B:
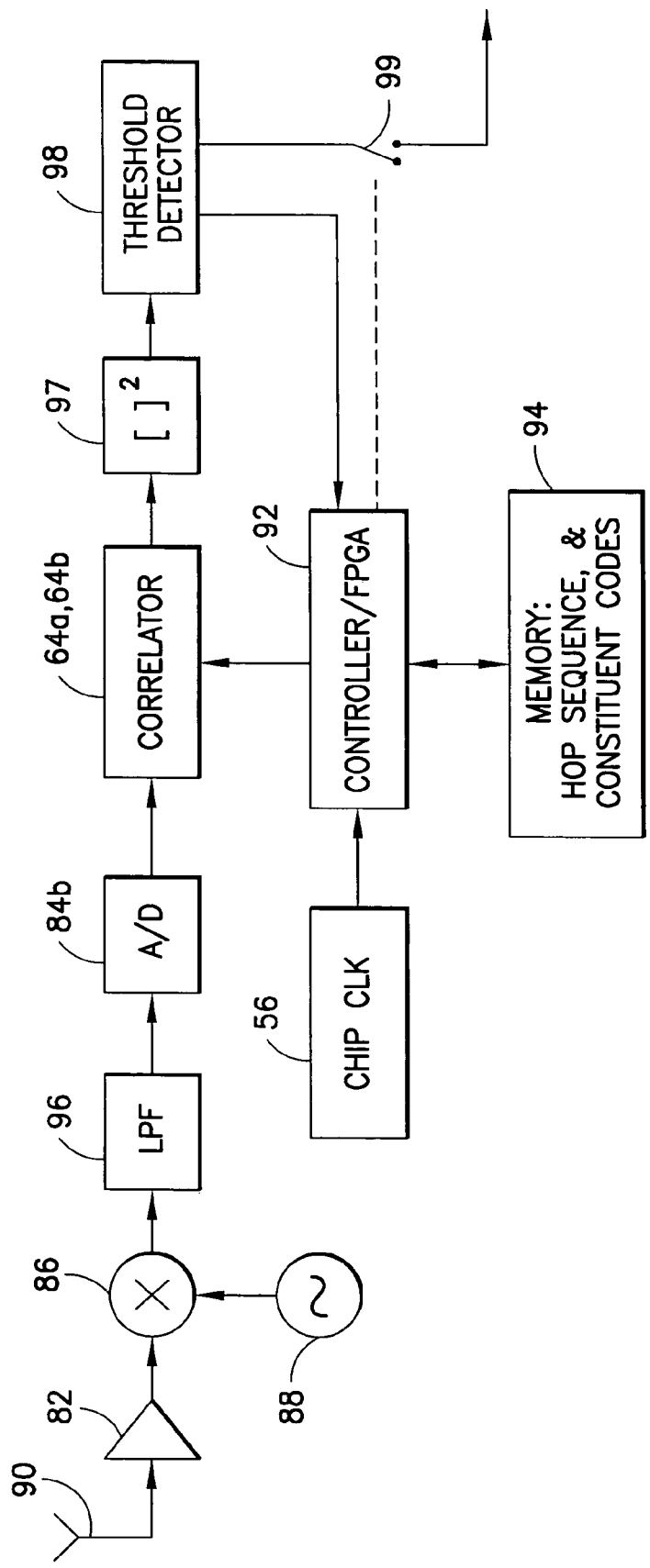
FIG. 10B is a schematic block diagram of a receiver in which either of the correlators of FIGS. 9A-9B may be disposed.

FIG. 10B is a schematic block diagram of a receiver showing relevant portions in the context of the correlator 64a, 64b of FIGS. 9A-9B. Like reference numbers indicate like components, and a descrambler is not explicitly shown though traditionally present in the receiver. A signal is received at an antenna 90, amplified 82, and multiplied 86 by a demodulating signal 88. A low pass filter 96 and conversion to digital 84b are traditional. The complex digital signal 62 is then input into the multi-level correlator 64a, 64b, though a traditional single-level correlator may be used with comparative penalties in hardware and processing time as compared to the multi-level embodiment. A magnitude block 97 squares the correlator output and a threshold detector 98 determines if the energy (squared) from the PNCA accumulator exceeds a threshold, indicating alignment. The threshold detector 98 provides feedback to inform the processor 92 if the threshold is exceeded, in which case the processor closes a switch 99 enabling the despread signal to be output for further processing and detection. As with the transmitter, the receiver ahs a controller 92, chip clock 56, and memory 94.

It is noted that the drawings and description presented herein are illustrative of the invention and not exhaustive. For example, while only one correlator is shown in each of FIGS. 9A-9B, it is understood that the received signal is traditionally divided into in-phase (I) and quadrature (Q) components, and each component is processed as described herein. Where complex QPSK modulation is used, it may be advantageous to include cross taps in the correlator as known in the art, but in each level of the described multi-level correlators. Design codes may be hopped according to a different spreading code with other parameters besides the spreading code itself changing on each hop or on a staggered basis, such as changing phase on each second hop of the design code. Various other changes and modifications will be obvious given the above disclosure and incorporated references. Such changes and modifications are within the spirit and scope of the invention and are not dedicated to the public.

What is claimed is:

1. A method of transmitting spread spectrum signals in a single communication session between a transmitter and a receiver, comprising: storing in a transmitter memory a series of N unique waveform designs and a hopping sequence of the N unique waveform designs; and transmitting a signal to a receiver using a plurality of the N unique waveform designs according to the hopping sequence, wherein N is an integer greater than two; in which each of the N waveform designs comprise a unique composite spreading code formed by a unique combination of at least some of a plurality of constituent code segments, wherein the hopping sequence defines a first one of the N unique waveform designs during a first time span and a second one of the N unique waveform designs during a second time span, wherein the first time span and the second time span do not overlap.

2. The method of claim 1, wherein at least three unique composite spreading codes that are consecutive within the hopping sequence are not orthogonal to one another.

3. The method of claim 1, wherein at least two of the composite spreading codes differ in a number of chips inserted between symbols.

4. The method of claim 1, wherein at least two of the composite spreading codes define different code lengths.

5. The method of claim 1 wherein at least two of the composite spreading codes differ from one another at least by either of a common set of constituent code segments combined by different combinatorial logic, or a different set of constituent code segments combined by common combinatorial logic.

6. The method of claim 1 wherein each of the N unique waveform designs differ from all of the other N waveform designs by at least one parameter comprising: composite code length, symbol timing, chip timing, symbol phase, chip phase, frame structure, burst structure, chip offset, modulation, error control coding, encryption scheme, and scrambling code.

7. The method of claim 1, wherein the signal is direct sequence spread by the unique composite spreading code.

8. A transmitter comprising: a memory for storing software instructions describing a plurality of unique waveform designs, and a hop sequence ordering the plurality of unique waveform designs; a data source; a field programmable gated array FPGA coupled to the memory having an input coupled to an output of the data source, for loading a signal from the data source according to different waveform designs as ordered by the hop sequence; and a transmit antenna coupled to an output of the FPGA for sending the loaded signal to a receiver using at least two of the different waveform designs; wherein the memory is further for storing a plurality of constituent code segments, the FPGA re-loads the software instructions on each change of waveform design ordered by the hop sequence, and wherein each waveform design comprises a unique composite spreading code formed by a unique combination of at least some of the plurality of constituent code segments, wherein the hop sequence defines a first one of the plurality of unique waveform designs during a first time span and a second one of the plurality of unique waveform designs during a second time span, wherein the first time span and the second time span do not overlap.

9. The transmitter of claim 8, wherein each of the composite spreading codes defines a length within about 2% of a nominal composite spreading code length, and not all lengths are identical.

10. The transmitter of claim 8, wherein no two composite spreading codes are unique in only a re-ordering of identical constituent codes combined by identical combinatorial logic.

11. The transmitter of claim 9, wherein at least two composite spreading codes differ in a number of chips inserted between symbols.

12. The transmitter of claim 8 wherein at least two of the composite spreading codes differ from one another at least by either of a common set of constituent code segments combined by different combinatorial logic or a different set of constituent code segments combined by a common combinatorial logic.

13. The transmitter of claim 8, each unique waveform design differs from each other waveform design in at least one parameter comprising: composite code length, symbol timing, chip timing, symbol phase, chip phase, frame structure, burst structure, chip offset modulation, error control coding, encryption scheme, and scrambling code.

14. The transmitter of claim 8, wherein each waveform design further defines direct sequence spreading of the signal using the unique composite spreading code.

* * * * *